US012063631B2

United States Patent
Yi et al.

(10) Patent No.: US 12,063,631 B2
(45) Date of Patent: Aug. 13, 2024

(54) METHOD AND APPARATUS FOR CONFIGURING FRAME STRUCTURE FOR NEW RADIO ACCESS TECHNOLOGY IN WIRELESS COMMUNICATION SYSTEM

(71) Applicant: LG Electronics Inc., Seoul (KR)

(72) Inventors: Yunjung Yi, Seoul (KR); Kijun Kim, Seoul (KR); Ilmu Byun, Seoul (KR); Seungmin Lee, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 16/097,132

(22) PCT Filed: Apr. 26, 2017

(86) PCT No.: PCT/KR2017/004459
§ 371 (c)(1),
(2) Date: Oct. 26, 2018

(87) PCT Pub. No.: WO2017/188733
PCT Pub. Date: Nov. 2, 2017

(65) Prior Publication Data
US 2019/0098626 A1 Mar. 28, 2019

Related U.S. Application Data

(60) Provisional application No. 62/476,625, filed on Mar. 24, 2017, provisional application No. 62/442,394, (Continued)

(51) Int. Cl.
*H04W 72/0446* (2023.01)
*H04L 5/00* (2006.01)
(Continued)

(52) U.S. Cl.
CPC .......... *H04W 72/0446* (2013.01); *H04L 5/14* (2013.01); *H04W 16/28* (2013.01); *H04W 72/02* (2013.01);
(Continued)

(58) Field of Classification Search
None
See application file for complete search history.

(56) References Cited

U.S. PATENT DOCUMENTS

2006/0058033 A1 3/2006 Marsan et al.
2008/0233960 A1 9/2008 Kangude et al.
(Continued)

OTHER PUBLICATIONS

Huawei et al., "Discussion on enhanced frame structure for latency reduction in TDD," 3GPP TSG RAN WG1 Meeting #84bis, dated Apr. 11-15, 2016, 9 pages.
(Continued)

*Primary Examiner* — Andre Tacdiran
(74) *Attorney, Agent, or Firm* — Fish & Richardson P.C.

(57) ABSTRACT

A network node in a new radio access technology (RAT) configures a fixed resource on which transmission direction is fixed and a flexible resource on which transmission direction is changeable, and transmits a single channel which is mapped to the fixed resource and the flexible resource. The single channel may be divided into a first mini channel which is mapped to the fixed resource and a second mini channel which is mapped to the flexible resource.

18 Claims, 24 Drawing Sheets

Related U.S. Application Data filed on Jan. 4, 2017, provisional application No. 62/438,972, filed on Dec. 23, 2016, provisional application No. 62/431,811, filed on Dec. 8, 2016, provisional application No. 62/328,000, filed on Apr. 26, 2016.

(51) Int. Cl.
  *H04L 5/14* (2006.01)
  *H04W 16/28* (2009.01)
  *H04W 72/02* (2009.01)
  *H04W 72/044* (2023.01)
  *H04W 72/12* (2023.01)

(52) U.S. Cl.
  CPC ....... *H04W 72/0473* (2013.01); *H04W 72/12* (2013.01); *H04L 5/0051* (2013.01); *H04L 5/0055* (2013.01)

(56) References Cited

U.S. PATENT DOCUMENTS

| | | |
|---|---|---|
| 2011/0188481 A1 | 8/2011 | Damnjanovic et al. |
| 2011/0319025 A1 | 12/2011 | Siomina et al. |
| 2014/0094162 A1 | 4/2014 | Heo et al. |
| 2015/0341877 A1 | 11/2015 | Yi et al. |
| 2016/0183296 A1 | 6/2016 | Yerramalli et al. |
| 2016/0330011 A1 | 11/2016 | Lee et al. |
| 2017/0048861 A1 | 2/2017 | Choi et al. |
| 2017/0063516 A1* | 3/2017 | Miao ................ H04L 5/14 |
| 2017/0118055 A1* | 4/2017 | Guey ............. H04L 1/0084 |
| 2017/0230962 A1* | 8/2017 | Park ............. H04L 1/1861 |
| 2017/0289869 A1 | 10/2017 | Nogami et al. |
| 2017/0311206 A1 | 10/2017 | Ryoo et al. |
| 2018/0152869 A1 | 5/2018 | Cedergren et al. |
| 2018/0206269 A1 | 7/2018 | Bhorkar et al. |
| 2018/0227958 A1* | 8/2018 | Xiong ............ H04W 72/0406 |
| 2018/0249374 A1* | 8/2018 | Park ............. H04J 11/00 |
| 2019/0044692 A1* | 2/2019 | Li ................ H04L 1/0007 |
| 2019/0053222 A1 | 2/2019 | Bhorkar et al. |

OTHER PUBLICATIONS

Intel Corporation, "Frame structure for new radio interface," 3GPP TSG RAN WG1 Meeting #84bis, dated Apr. 11-15, 2016, 7 pages.
MediaTek Inc., "Views on Frame Structure for New Radio Access Technology," 3GPP TSG RAN WG1 Meeting #84bis, dated Apr. 11-15, 2016, 6 pages.
NTT DOCOMO, Inc., "Initial views on frame structure for NR access technology," 3GPP TSG RAN WG1 Meeting #84bis, dated Apr. 11-15, 2016 9 pages.
United States Office Action in U.S. Appl. No. 16/097,070, dated Nov. 10, 2020, 14 pages (with English translation).

* cited by examiner

METHOD AND APPARATUS FOR CONFIGURING FRAME STRUCTURE FOR NEW RADIO ACCESS TECHNOLOGY IN WIRELESS COMMUNICATION SYSTEM

CROSS-REFERENCE TO RELATED APPLICATIONS

This application is a National Stage filing under 35 U.S.C. 371 of International Application No. PCT/KR2017/004459, filed on Apr. 26, 2017, which claims the benefit of U.S. Provisional Applications No. 62/328,000 filed on Apr. 26, 2016, No. 62/431,811 filed on Dec. 8, 2016, No. 62/438,972 filed on Dec. 23, 2016, No. 62/442,394 filed on Jan. 4, 2017, and No. 62/476,625 filed on Mar. 24, 2017. The disclosures of the prior applications are incorporated by reference in their entirety.

TECHNICAL FIELD

The present invention relates to wireless communications, and more particularly, to a method and apparatus for configuring a frame structure for a new radio access technology (RAT) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have been discussed. Specifically, a new frame structure may need to be required.

DISCLOSURE OF INVENTION

Technical Problem

The present provides a method and apparatus for configuring a frame structure for a new radio access technology (RAT) in a wireless communication system. The present invention discusses inter-cell interference coordination (ICIC) mechanisms for time division duplex (TDD) based new RAT design, particularly when different transmission time interval (TTI) lengths and different downlink/uplink (DL/UL) switching points are used for different services.

Solution to Problem

In an aspect, a method for configuring a frame structure by a network node in a wireless communication system is provided. The method includes configuring a fixed resource on which transmission direction is fixed and a flexible resource on which transmission direction is changeable, and transmitting a single channel which is mapped to the fixed resource and the flexible resource.

In another aspect, a network node in a wireless communication system is provided. The network node includes a memory, a transceiver, and a processor, coupled to the memory and the transceiver, that configures a fixed resource on which transmission direction is fixed and a flexible resource on which transmission direction is changeable, and controls the transceiver to transmit a single channel which is mapped to the fixed resource and the flexible resource.

Advantageous Effects of Invention

New frame structure can be configured for new RAT.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
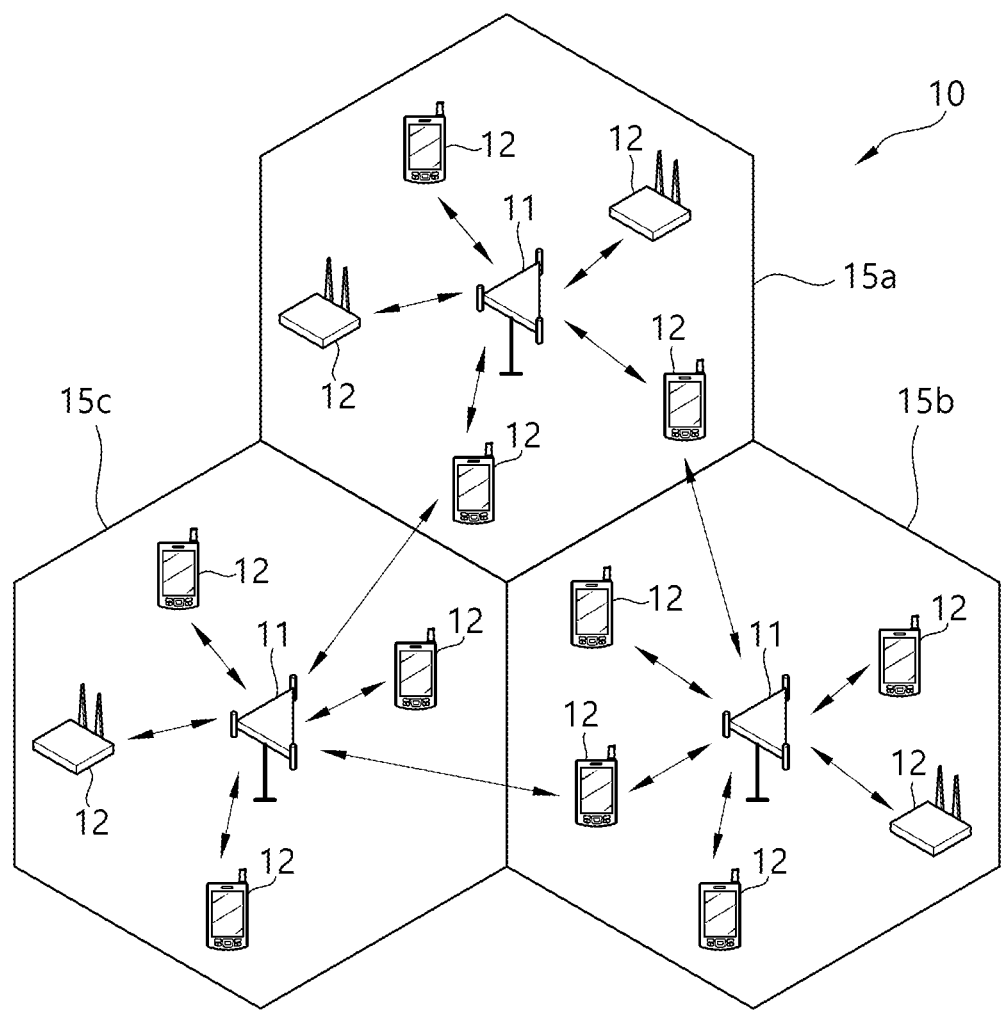
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
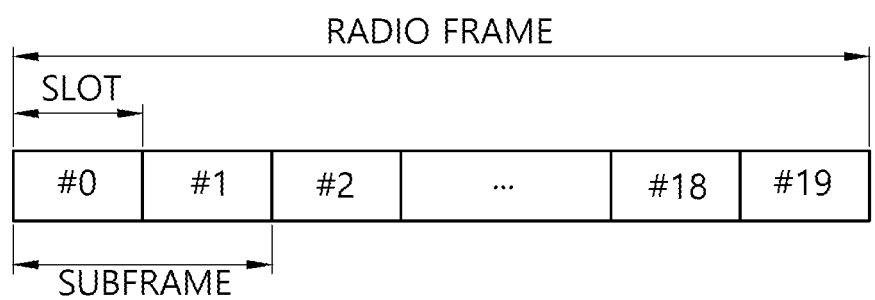
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
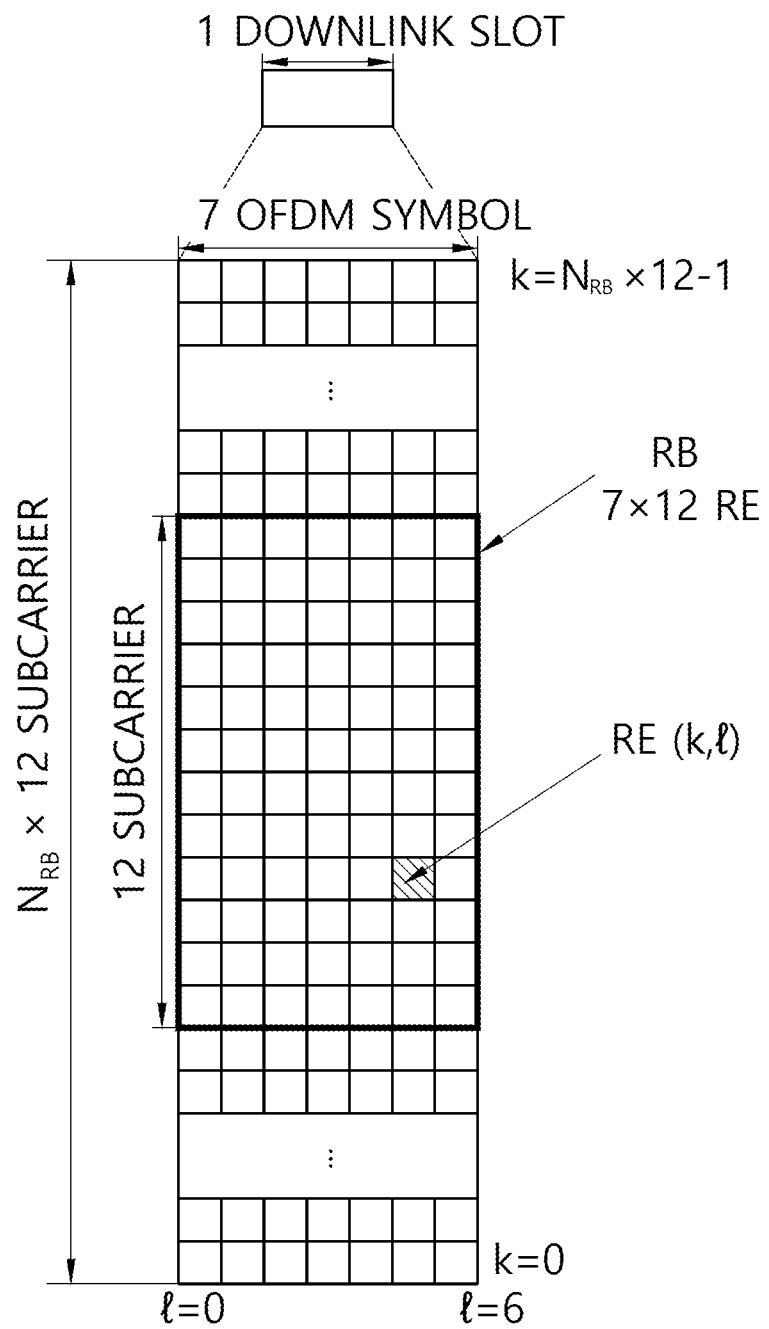
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (RAT).

It is expected that different frame structure may be necessary for the new RAT. Particularly, different frame structure in which UL and DL may be present in every subframe or may change very frequently in the same carrier may be necessary for the new RAT. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In the new RAT, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in the new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

Figure 4:
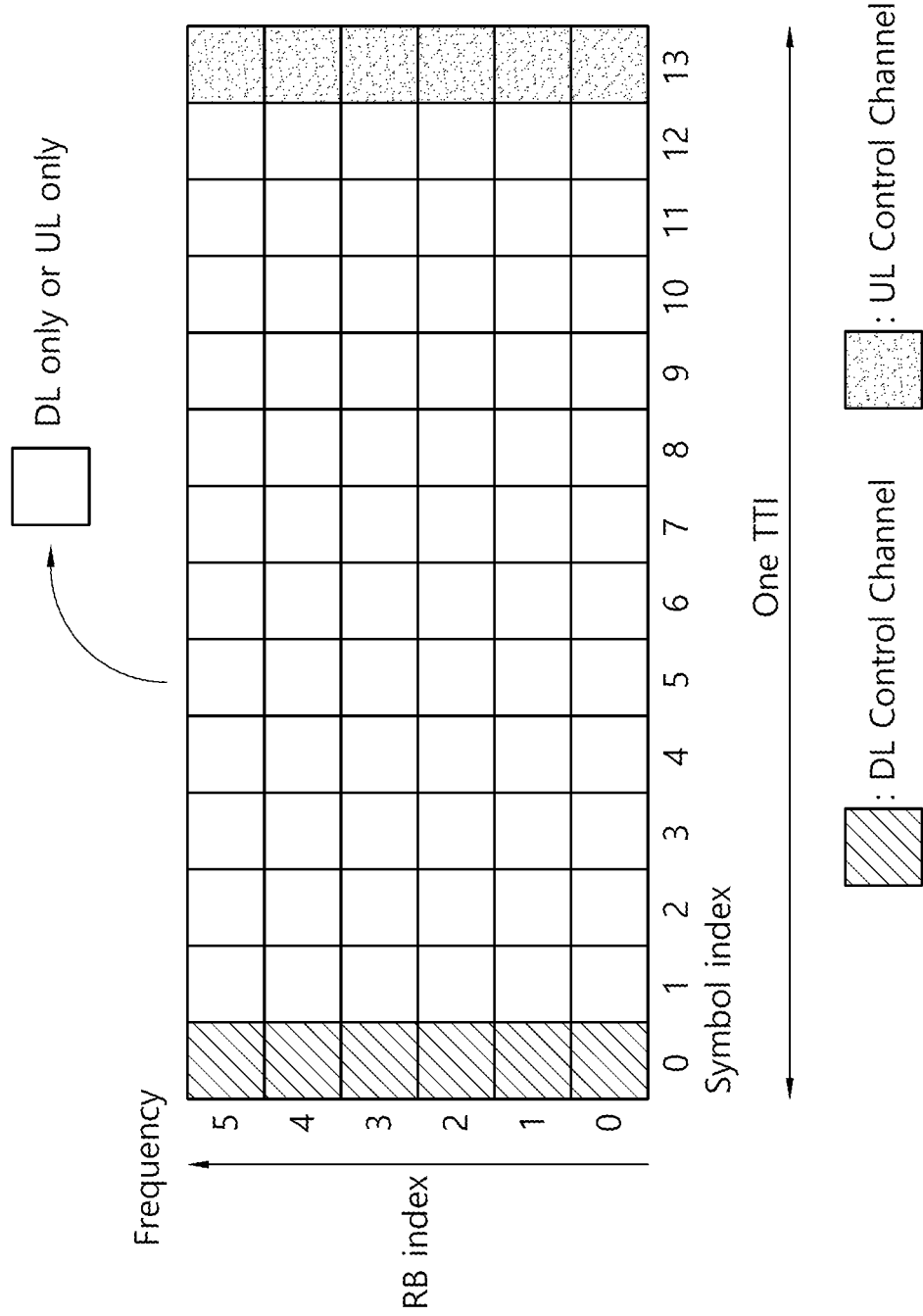
FIG. 4 shows an example of subframe type for new RAT.

FIG. 4 shows an example of subframe type for new RAT. The subframe shown in FIG. 4 may be used in TDD system of new RAT, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Further, in the new RAT, it may be considered to have different durations of TTI for different services with or without different subcarrier spacing. For example, a frame structure type 1 (FS1) may be formed to support, e.g. enhanced mobile broadband (eMBB) use cases while a frame structure type 2 (FS2) may be formed to support, e.g. mMTC. For another example, single cell transmission and SFN transmission may utilize different subcarrier spacing. In the description below, for the convenience, it is assumed that the FS1 and FS2 are configured and coexist in the same carrier. The FS1 may be a baseline frame structure used for such as for eMBB use cases or typical use cases. The FS2 may be used for some other applications such as mMTC, ultra-reliable and low latency communication (URLLC), an enhanced vehicle-to-everything (eV2X) communication.

The network or a cell may support one or multiple frame structures at the same time. For the convenience, the present invention may discuss relationship between two frame structures. However, more than two frame structures may be supported simultaneously. Further, eNB in the description below may be replaced by gNB which is entity of the new RAT. The eNB may refer any network entity relevant in each communication protocol framework without the loss of generality.

Figure 5:
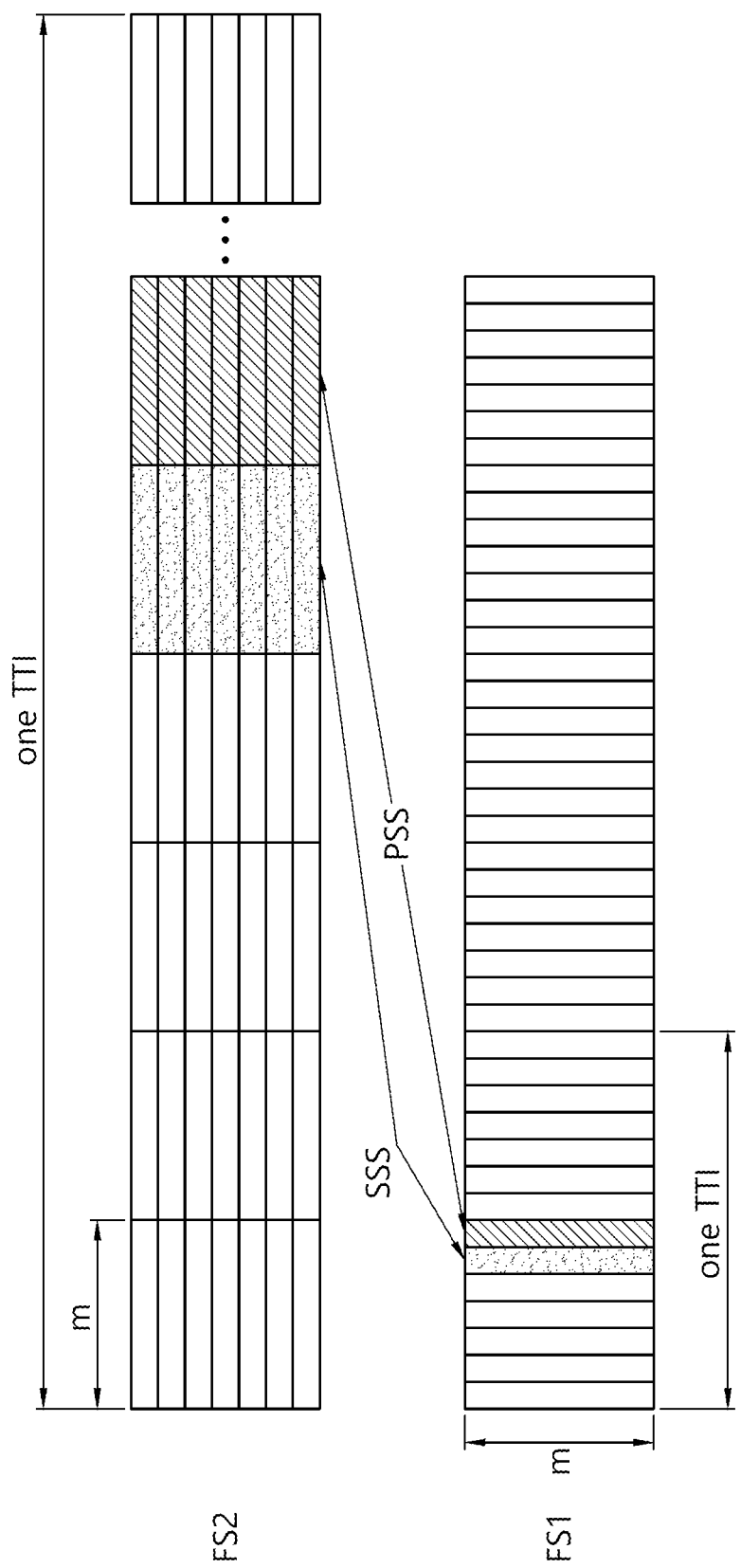
FIG. 5 shows an example of a frame structure for a new RAT.

FIG. 5 shows an example of a frame structure for a new RAT. Referring to FIG. 5, frame structures utilizing different subcarrier spacing in potentially different subbands are described. It is shown that FS1 is the same as the conventional frame structure, as one TTI includes 14 symbols. That is, one TTI of FS1 is 1 ms. On the other hand, one TTI of FS2 is 'm' ms. 'm' may be predetermined. Or, 'm' may be determined based on subcarrier spacing used for mMTC.

Figure 6:
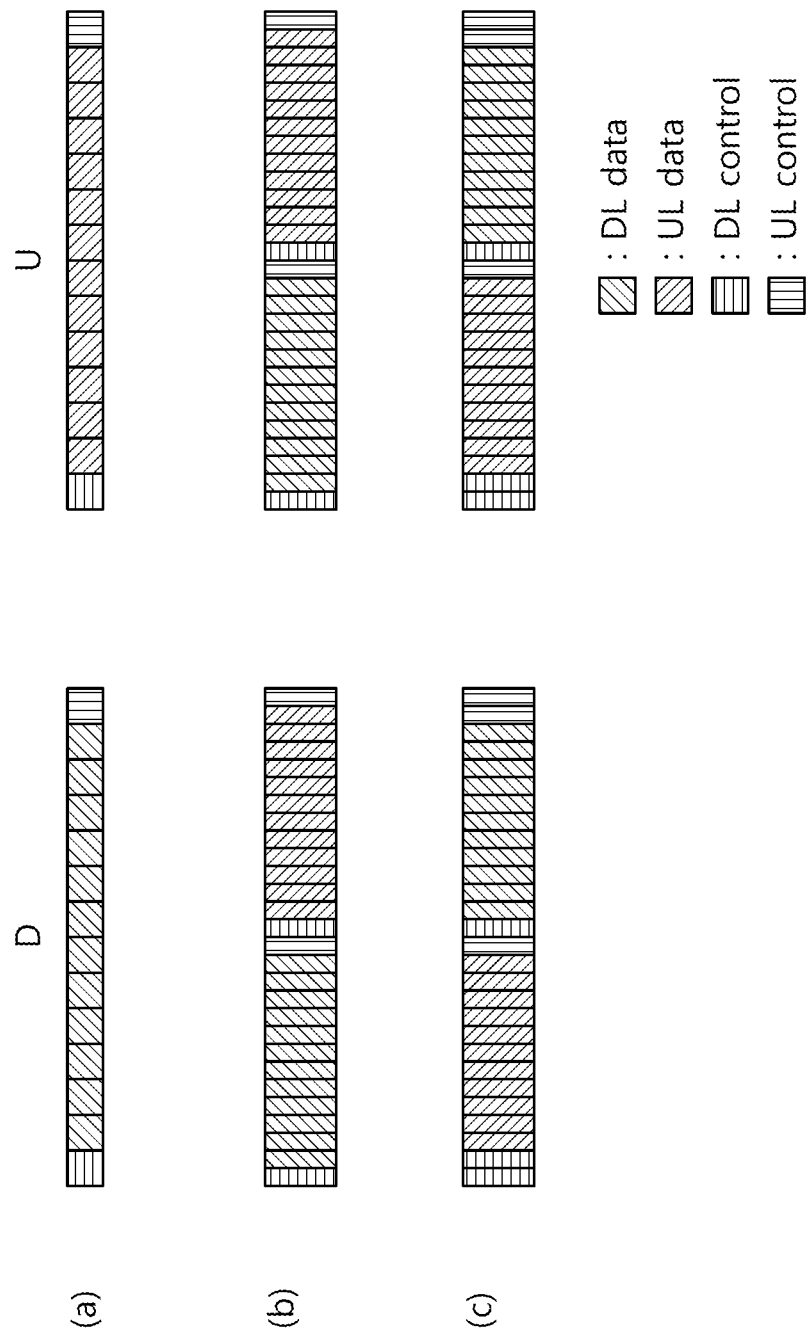
FIG. 6 shows another example of a frame structure for a new RAT.

FIG. 6 shows another example of a frame structure for a new RAT. FIG. 6-(a) shows an example of FS1 which corresponds to the self-contained subframe structure. FIG. 6-(b) and FIG. 6-(c) show an example of FS2 in which different number, positions, duration of DL/UL switching points and DL/UL portions may be expected depending on subcarrier spacing or TTI length.

Using different frame structure and/or numerology may not be a big problem in FDD case as the interference of DL/UL transmissions between intra-cell transmissions and inter-cell transmissions may not be mixed. However, if TDD type of frame structure is considered, these may imply that different DL/UL switching points among neighbor cells and also between subbands within a cell or in the frequency band may occur. This may impact considerably interference to neighbor cells unless all interfering cells are aligned. Furthermore, this may also impact adjacent carrier options. Also, it may become difficult to multiplex different TTIs or different subcarrier spacing with different DL/UL switching in the same time from a cell perspective, which may limit the flexibility.

Hereinafter, the present invention discusses how to handle these cases in the same cell, among neighbor cells with ideal backhaul and among neighbor cells without ideal backhaul via such as clustering, adjacent carrier. For this, required signaling and UE behaviors are proposed according to embodiments of the present invention.

1. At first, different DL/UL switching points in the same cell per subband, when the network does not support self-interference cancellation (i.e. no full-duplex radio (FDR) capability in the same time/frequency resource) is described according to an embodiment of the present invention. Due to different subcarrier spacing (and thus, the overall length of one TTI may be different which may contain the same number of OFDM symbols) or different TTI length, if a cell supports multiple different TTI sizes and at most one DL/UL switching point may be defined per TTI, there may be different DL/UL switching points among different TTI sizes supported by the same cell. If the network does not support full duplex DL and UL at the same frequency, one of the following approaches may be considered.

(1) A guard band or DL/UL duplex gap may be placed between DL subband and UL subband at the same time. The duplex gap may be used by neighbor cells or another cell.

Figure 7:
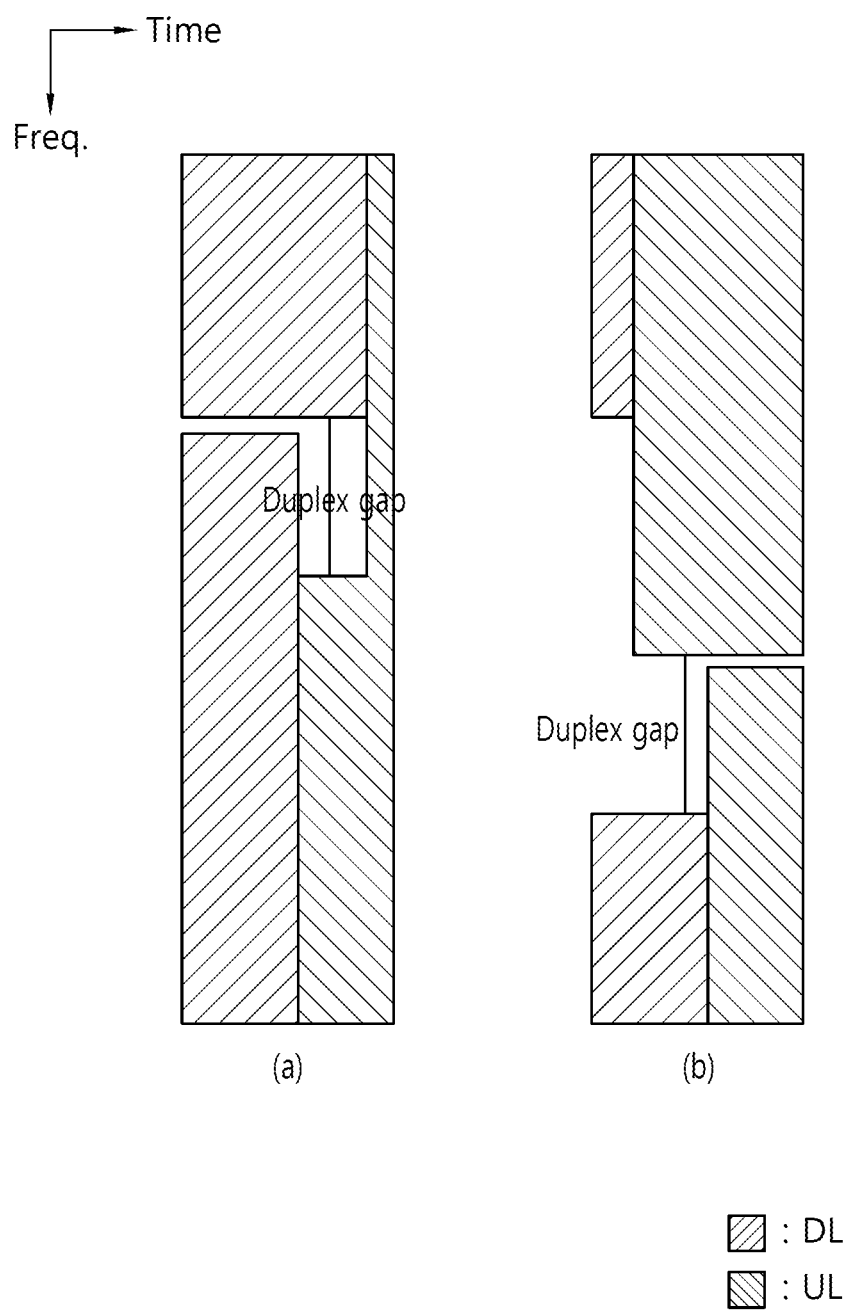
FIG. 7 shows an example of a frame structure according to an embodiment of the present invention.

FIG. 7 shows an example of a frame structure according to an embodiment of the present invention. Referring to FIG. 7, the duplex gap is created for FS2 (i.e. shorter TTI case) by blanking some resources. That is, the duplex gap may be configured by considering multiple DL/UL switching points in frequency division multiplexing (FDM) manner.

This approach may lead resource inefficiency due to blanking resources for the duplex gap. Furthermore, unless neighbor cells are aligned to apply the same DL/UL switching points in different subband, inter-cell interference may also increase considerably. To support this, the network may be equipped with FDR capability without self-interference cancellation capability or limited self-interference cancellation capability. In this case, each cell may exchange a duplex gap configuration in terms of frequency/time, such that neighbor cells can also protect duplex gap. Also, each cell may exchange DL/UL configuration per different numerology and it may be desired to align DL/UL configuration per numerology.

Considering the duplex gap and different DL/UL switching points with potentially different guard period (GP), the followings may be considered in terms of placing different DL/UL switching points within a frequency band in which each subband may be used by different use case or different UE groups with different TTI lengths or same TTI length.

In terms of determining the duplex gap, potential interference from DL transmission to UL transmission (and some interference from UL transmission to DL transmission) needs to be considered. Thus, larger duplex gap may be necessary with higher DL transmission power. With UE-specific reference signal (RS) demodulation, it is expected that each subband or different physical resource block (PRB) may have different DL power. Though it is not directly related, generally, it may be expected that higher power transmission may also require the larger GP (which may not be true in high frequency transmission). For the transmission with higher power, to receive UL transmission concurrently, larger duplex gap may be used.

Figure 8:
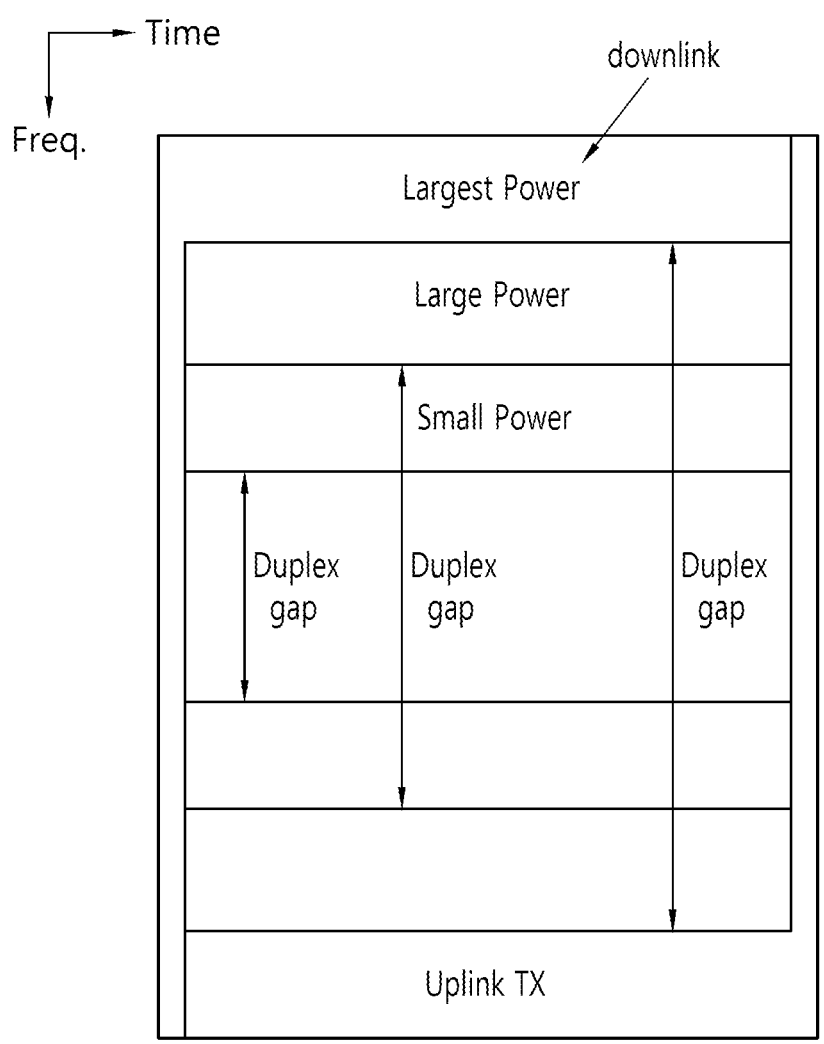
FIG. 8 shows an example of a frame structure according to another embodiment of the present invention.

FIG. 8 shows an example of a frame structure according to another embodiment of the present invention. Referring to FIG. 8, a duplex gap increases as transmission power increases. That is, with the largest transmission power, the widest duplex gap is used. And with the smallest transmission power, the narrowest duplex gap is used.

To allow flexible change of DL/UL in different numerology, it may be considered to partition resources based on power/TTI length/numerology.

Figure 9:
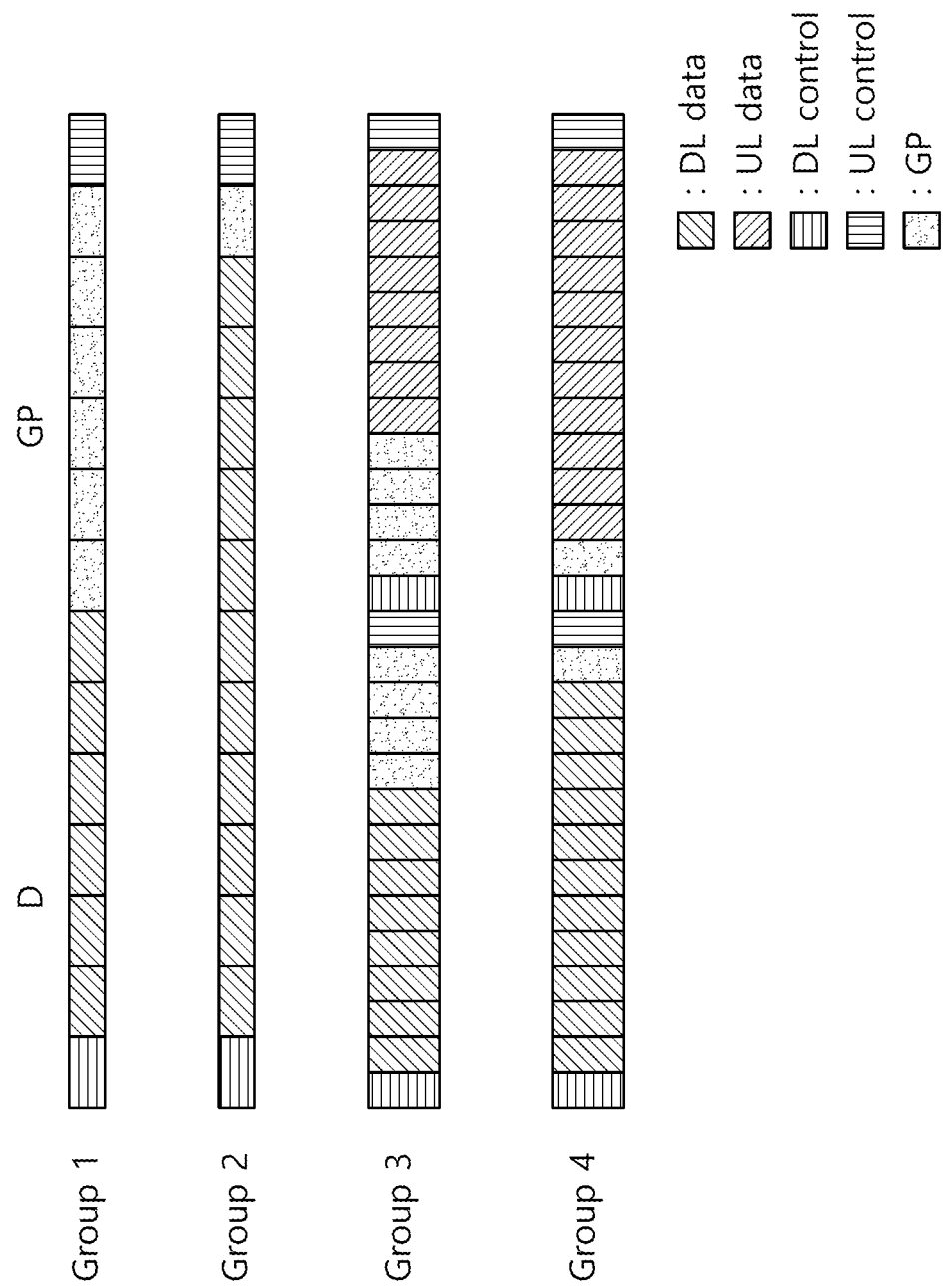
FIG. 9 shows an example of a group of subbands according to an embodiment of the present invention.

FIG. 9 shows an example of a group of subbands according to an embodiment of the present invention. In FIG. 9, it is assumed that there are four groups of subbands. The group 1 corresponds to a subband with high power with large GP. The group 2 corresponds to a subband with large power with small GP. The group 3 corresponds to a subband with small power with higher subcarrier spacing with large GP. The group 4 corresponds to a subband with small power with higher subcarrier spacing with small GP. Each group may be mapped to different region to minimize potential interference among each other regardless of dynamic DL/UL switching. This may be more efficient to handle inter-cell interference coordination, it may become more difficult to dynamically adapt the duplex gap as among cells to minimize interference between DL/UL.

Figure 10:
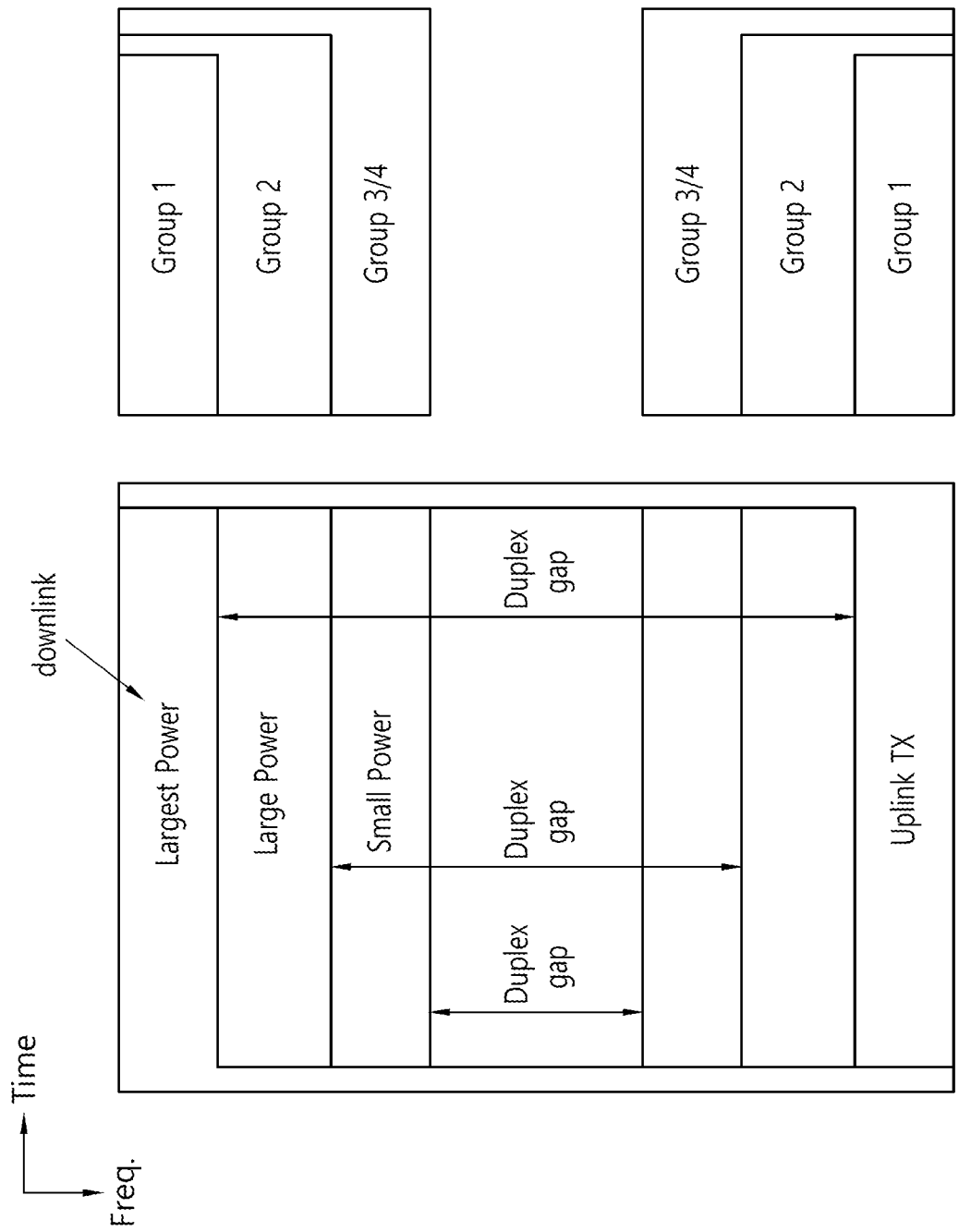
FIG. 10 shows an example of a frame structure according to another embodiment of the present invention.

FIG. 10 shows an example of a frame structure according to another embodiment of the present invention. Referring to FIG. 10, the group 1 may utilize edge subbands for DL/UL considering DL/UL switching of other groups and high transmission power. For the group 2, resources for the group 1 may be used as it may satisfy the duplex gap required for other group's potential UL transmission during the DL transmission of the group 2. For the group 3/4, resources for the group 1/2 may be used, and additional resources may also be available as the transmission power is low. To minimize unused resources for the duplex gap, it may be highly desirable to align at least some portions of DL/UL switching points between different subbands/TTI lengths.

Meanwhile, regarding inter-cell interference coordination (ICIC), different approaches may be considered.

DL/UL portions may be aligned in terms of time/frequency resources among neighbor cells. For example, resource usage or partition may be aligned among neighbor cells, including the direction of UL or DL for FS1 in each cell.

DL and UL portions may be fixed in a resource unit or TTI which may be used for DL and UL transmissions regardless of actual traffic. Other resources may be used for DL or UL which may be used with lower power to minimize the interference to neighbor cells. This fixed DL/UL portion may be determined per subband or over the entire available system bandwidth.

Figure 11:
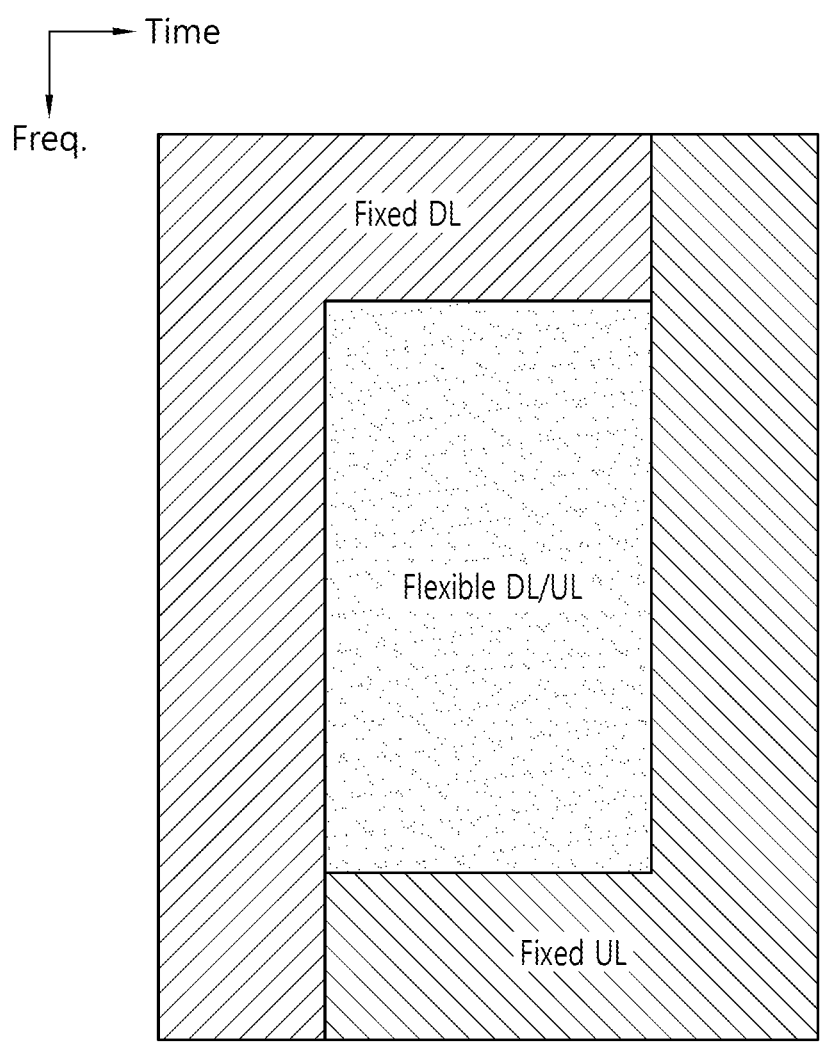
FIG. 11 shows an example of a frame structure according to another embodiment of the present invention.

FIG. 11 shows an example of a frame structure according to another embodiment of the present invention. Referring to FIG. 11, fixed DL/UL resources are configured, the remaining resources are used for flexible DL/UL resources. Fixed/flexible resource may be defined based on TTI length of FS1. The fixed resource may be different per TTI. Or, a set of different types with different duration/size of fixed DL/UL resources & flexible DL/UL resources may be configured.

(2) DL/UL switching points may be aligned with the shortest TTI length (or, with subcarrier length or TTI length in terms of OFDM symbols). In this case, frame structure with smaller subcarrier spacing or larger TTI length may have multiple DL/UL switching points within one TTI.

Figure 12:
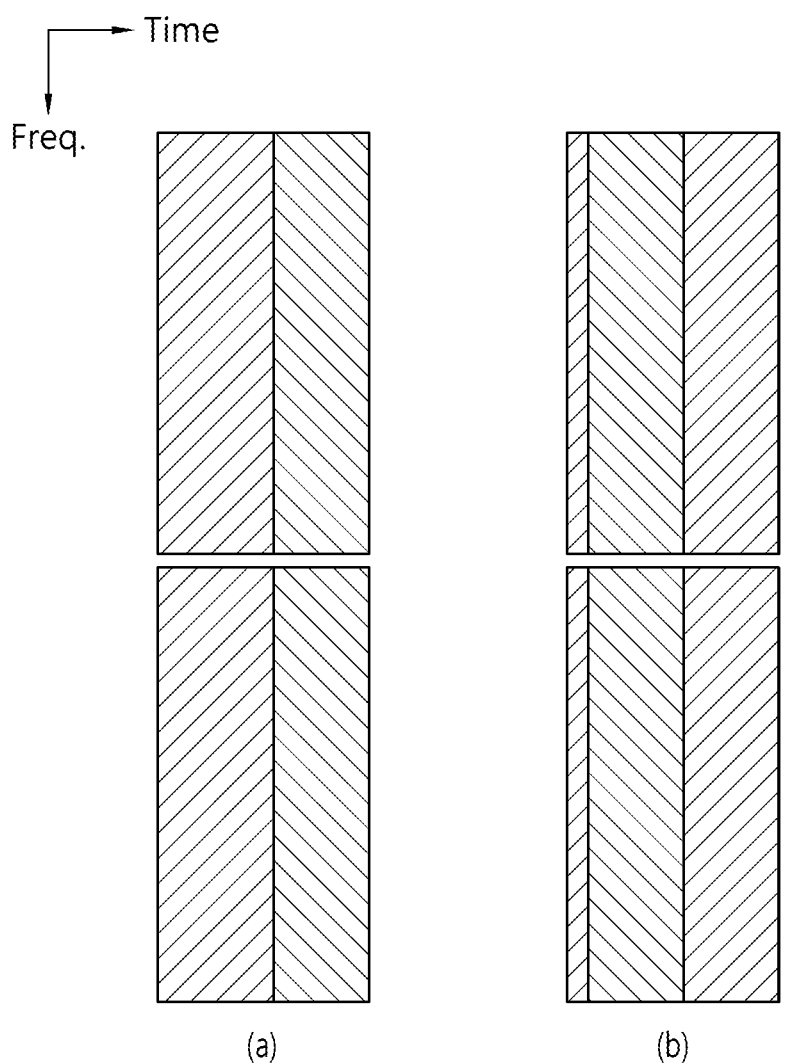
FIG. 12 shows an example of a frame structure according to another embodiment of the present invention.

FIG. 12 shows an example of a frame structure according to another embodiment of the present invention. Referring to FIG. 12, DL/UL switching points may be aligned with the shortest TTI length, i.e. TTI length of FS2. It is shown in FIG. 12-(b) that two DL/UL switching points are configured in one TTI.

If this approach is used, inter-cell interference coordination may be done by exchanging DL/UL configuration of the shortest TTI among neighbor cells. This DL/UL configuration may a reference DL/UL configuration. If a cell wants to operate different direction from the aligned reference DL/UL configuration, it may reduce DL power or increase UL power to mitigate the interference. In this case, if the shortest TTI is used, larger TTI may need to reduce DL power in the middle of transmission. For example, based on FS2, if DL/UL configuration "DUDUDUDU" is a reference DL/UL configuration among neighbor cells, and when FS1 wants to operate "D" which would span "m" TTIs of FS2, the aligned portion may be transmitted without concerning interference. However, in other portions which are allocated for UL in the reference DL/UL configuration whereas FS1 uses for "D", interference mitigation technique is necessary. In this case, during the transmission, power reduction may be necessary. This needs to be known to the UE so that the UE may take different power into its channel estimation/data demodulation appropriately.

(3) A reference frame structure type may be used for DL/UL switching, and multiple shorter TTIs may be allowed within one TTI of reference frames structure. In other words, in this approach, DL/UL switching may be aligned among different TTIs based on reference TTI which may be configured by the network or determined by initial synchronization procedure.

Figure 13:
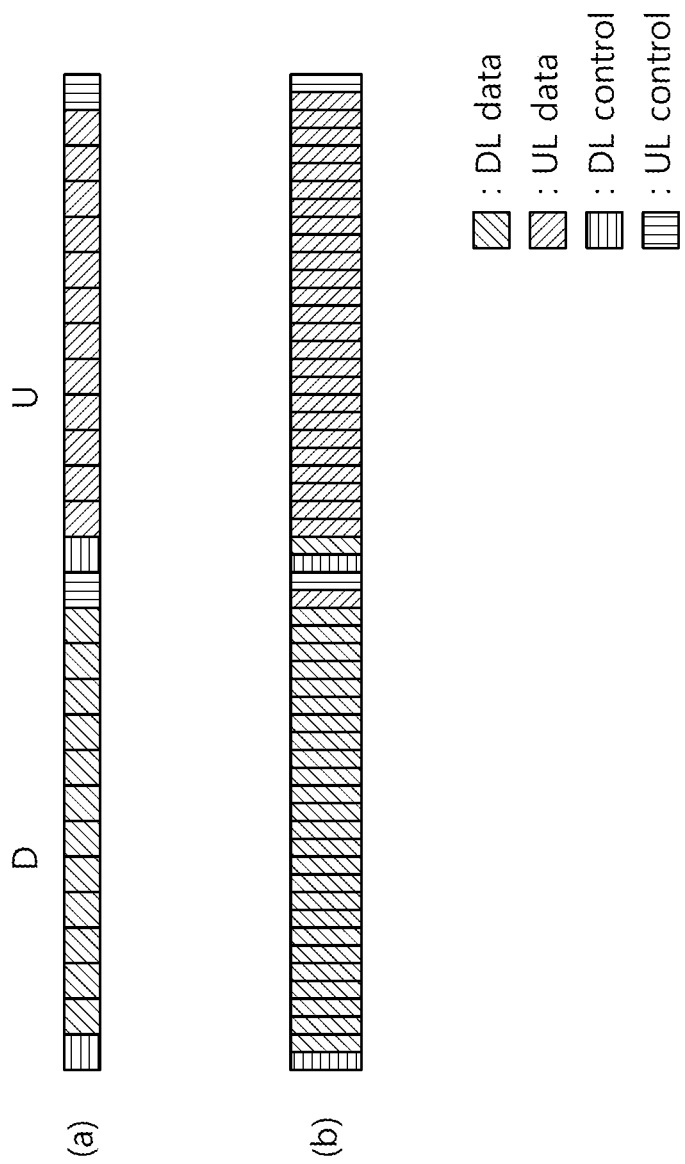
FIG. 13 shows an example of a frame structure according to another embodiment of the present invention.

FIG. 13 shows an example of a frame structure according to another embodiment of the present invention. Referring to FIG. 13, FIG. 13-(a) corresponds FS1, and FIG. 13-(b) corresponds to FS2. FS1 is considered as reference frame structure. Therefore, FS1 may be used for DL/UL switching for FS2. DL/UL switching is aligned among different TTIs of FS1 and FS2 based on reference TTI, i.e. TTI of FS1.

In this case, in inter-cell interference perspective, alignment at the reference frame structure level seems sufficient. If this approach is used, inter-cell interference coordination may be done by exchanging DL/UL configuration of the reference TTI among neighbor cells. This DL/UL configuration may be a reference DL/UL configuration. If a cell wants to operate different direction from the aligned reference DL/UL configuration, it may reduce DL power or increase UL power to mitigate the interference. In this case, if the reference TTI is larger than the current FS, smaller TTI may reduce DL power in each TTI. For example, based on FS1, if DL/UL configuration "DUDUDUDU" is a reference DL/UL configuration among neighbor cells, and when FS2 wants to operate "DU . . . DU" (m TTIs) which would span 1 TTI of FS1, the aligned TTIs of FS2 may be transmitted without concerning interference. However, in other TTIs which are allocated for UL in the reference DL/UL configuration whereas FS2 uses for "D", interference mitigation technique is necessary. In this case, during the transmission, power reduction may be necessary.

If reference TTI is smaller than the current TTI, similar mechanism mentioned in (2) may be used. Uplink control information (UCI) transmission which spans only a few OFDM symbols may occur without concerning potential interference to other cells. From a cell perspective, this may occur by puncturing DL transmission as well. If UCI portions is known to UEs in advance, a UE may be able to assume that UCI portions of lower TTI length frame structure(s) may be always punctured (or whether to puncture always or not may be higher layer configured).

(4) Multi-carrier may be utilized for DL and UL. If the network has multiple carriers, different carrier may be placed with DL or UL subframe/TTI, such that different numerology or TTI may be multiplexed without significant impact. This may be done in intra-band (i.e. utilizing edge spectrum with duplex gap) or inter-band carriers.

(5) Coordinated multi-point (CoMP) operation may be utilized with different power per each FS. That is, different power may be used per frame structure. For example, with the reference frame structure, the network may be able to utilize the maximum power. If shorter TTI or larger TTI compared to reference TTI structure wants to utilize different UL or DL direction from the reference frame structure (assuming reference frame structure is aligned among neighbor cells), different power may be used. Or, some resources may be puncture.

Figure 14:
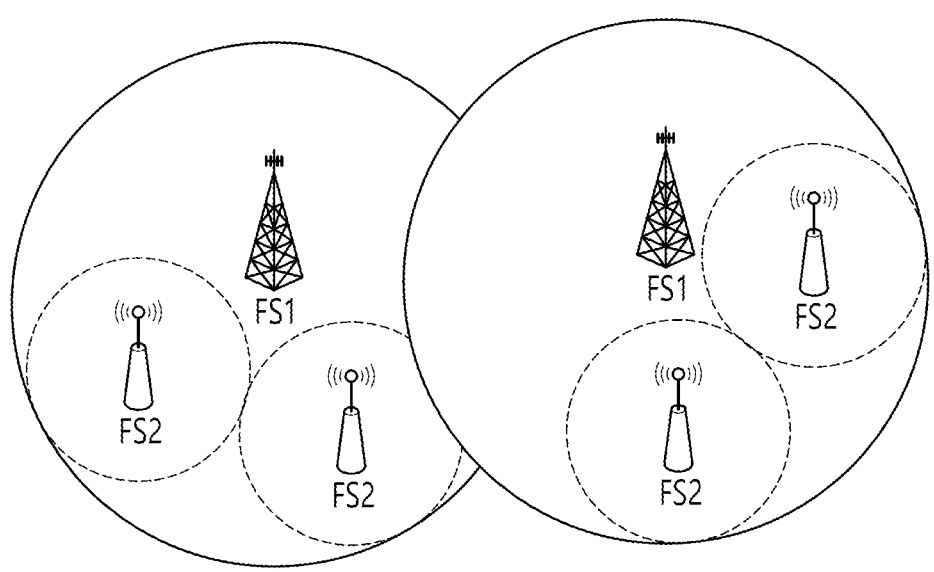
FIG. 14 shows an example of using different power per each FS according to an embodiment of the present invention.

FIG. 14 shows an example of using different power per each FS according to an embodiment of the present invention. Referring to FIG. 14, cells operating in FS1 and FS2 may be different from each other, and they may use different power such that cell ranges may be different from each other, and accordingly, interference ranges may be different from each other. Assuming there is negligible interference between FS1 of one cell and FS2 of other cell belonging to different FS1 cell, inter-cell interference from FS1 and FS2 may be limited to the cell with overlapped coverage. For those cells, similar handling to the above mentioned cases (e.g. sufficient blank resources, or reduced power of FS2 DL transmission further to reduce the interference on FS1) may be considered. From a UE perspective, it may be connected with both cells with FS1 and FS2 depending on its usage. Similar mechanism used in enhanced interference management and traffic adaptation (eIMTA) may be applied in this case (e.g. reduce FS2 power in FS1 UL portion or vice versa). Alternatively, if analog beam forming is used, when FS2 performs DL transmission, FS1 may perform UL transmission from different beam directions (and vice versa).

(6) Different power may be utilized per each FS Similar to (5), in a single cell, different power may be used in different frame structure. This may be useful to determine clustering in which cells belonging to the same cluster needs to align DL/UL switching points.

Figure 15:
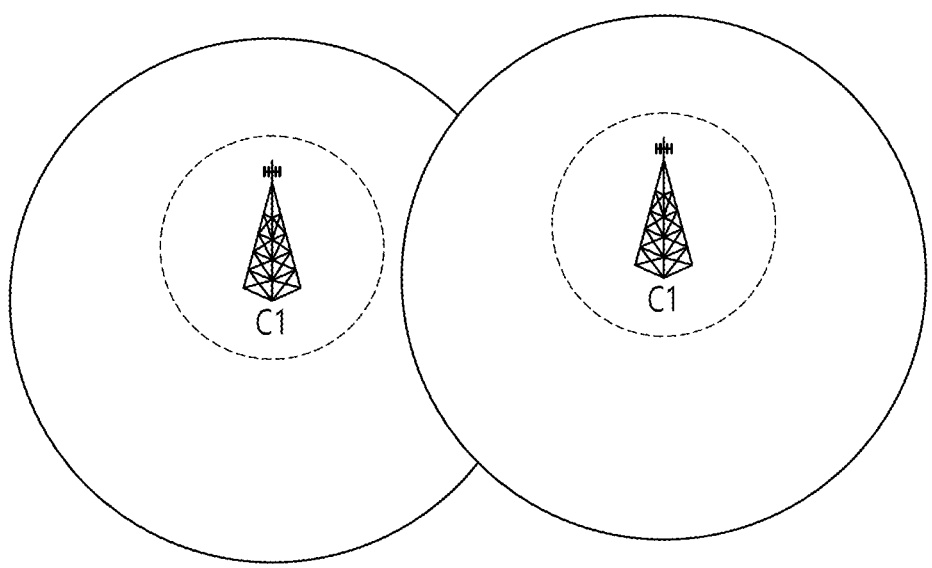
FIG. 15 shows an example of using different power per each FS according to another embodiment of the present invention.

FIG. 15 shows an example of using different power per each FS according to another embodiment of the present invention. Referring to FIG. 15, cells C1 and C2 need to align its DL/UL with maximum power for FS1, whereas it does not need to align for FS2 with lower power. In other words, depending on its maximum power, different clustering to align DL/UL switching points may be determined. Within one cell, the above mentioned approaches may be applied.

(7) Different guard period may be utilized among neighbor cells. In this approach, the number of DL OFDM symbols and UL OFDM symbols may be fixed. DL OFDM symbols and UL OFDM symbols may be aligned among neighbor cells per time/frequency resource sharing the same numerology. Further, other OFDM symbols may be allowed for flexible usage.

Figure 16:
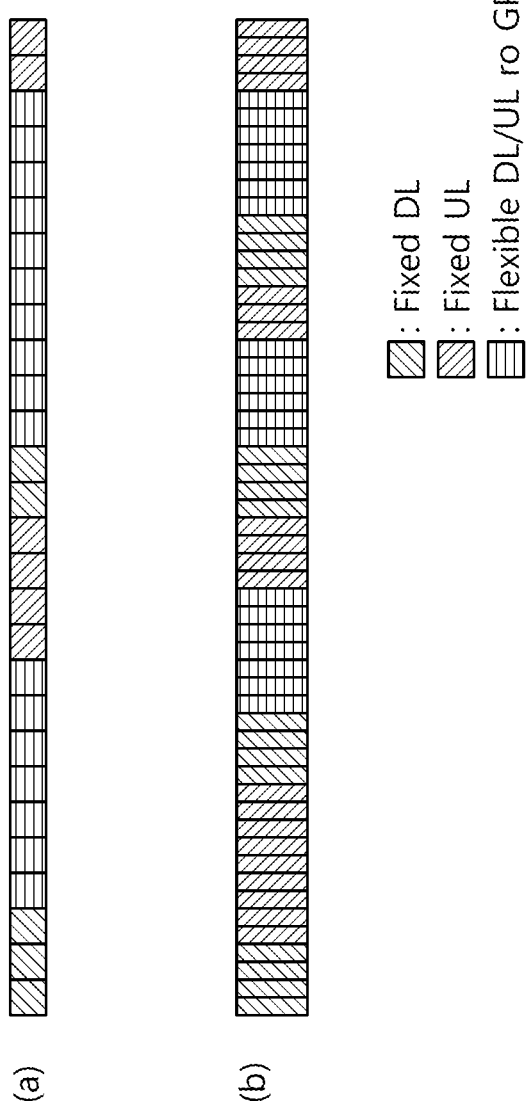
FIG. 16 shows an example of a frame structure according to another embodiment of the present invention.

FIG. 16 shows an example of a frame structure according to another embodiment of the present invention. Referring to FIG. 16, DL/UL OFDM symbols are aligned among FS1 and FS2, and the remaining OFDM symbols are used for flexible usage or GP.

As fixed DL/UL portions are aligned among neighbor cells, DL/UL transmission with full power in those portions may be possible when network is synchronized. In flexible DL/UL portion or GP, depending on interfering cells, the power may be determined, and it may be used for UEs reachable with those reduced power. For example, the network may configure P1 (maximum power), P2 (one level lower), P3 (two level lower), etc., where P1 can cover the cell coverage, and P2 can cover smaller coverage, and so on. The value of P1, P2 and P3 . . . may be higher layer configured or indicated by cell broadcast messages. When the network transmits synchronization signals, the UE, based on measurement, may report which range it can belong to. Depending on the power class that a UE can belong, different GP configuration may be considered. For example, the UE may be supported with only P1, the subframe type may be configured as full GP for the flexible DL/UL portions (i.e. no transmission). For a UE with P2, the subframe type may be determined/aligned among cells which are belonging to the same clustering (or interfering cells).

Figure 17:
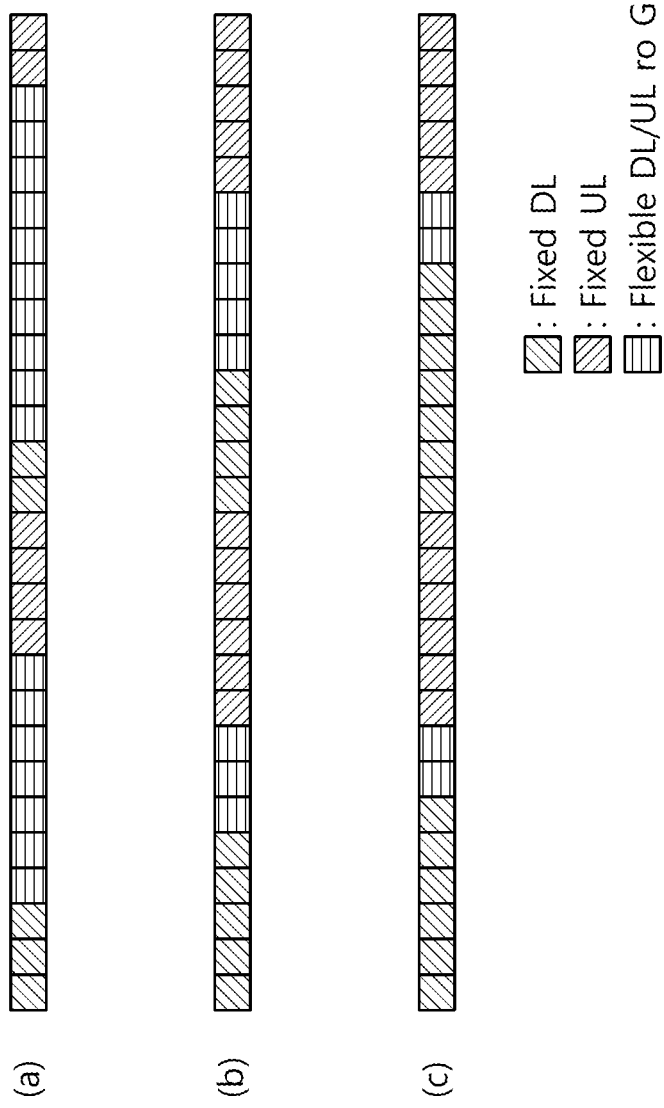
FIG. 17 shows an example of a frame structure according to another embodiment of the present invention.

FIG. 17 shows an example of a frame structure according to another embodiment of the present invention. FIG. 17 shows the subframe type for different power. FIG. 17-(a) shows a frame structure with power P1, i.e. the maximum power, aligned among C1/C2/C3. In this frame structure, all of flexible DL/UL portions are used for GP. FIG. 17-(b) shows a frame structure with power P2, i.e. the one level lower power, aligned among C1/C2. FIG. 17-(c) shows a frame structure with power P3, i.e. the two level lower power, aligned among C3.

In other words, different subframe type may be aligned/coordinated among different set of cells based on power, and if there is no neighbor cells to coordinate in some power level, full flexible usage of GP portion may be considered. Smaller power (or smaller coverage range) should keep fixed DL/UL portion of higher power (or larger coverage range cases).

By considering coordination between different subbands with different numerology, and also coordination among neighbor cells, each cell may indicate intended numerology used in a set of time/frequency resource (if multiple, multiple sets may be indicated) via backhaul signaling or air interface. It may be encouraged to utilize the same numerology in the same time/frequency resource. It may also be encouraged to utilize the same DL/UL switching points and portions in the same time/frequency resource. This may be done via clustering or master-slave structure to coordinate the configuration or network management. For neighbor cell coordination, DL/UL switching points may be aligned (maybe only fixed DL/UL portions). In a resource unit (RU) configured as DL, full duplex eNB may also perform UL transmission considering interference from neighbor cells. In the RU configured as UL, full duplex eNB may also perform DL transmission with lower power to minimize interference to neighbor cells.

2. At second, different DL/UL switching points in the same cell per subband, when the network supports self-interference cancellation (i.e. FDR capability in the same time/frequency resource) is described according to an embodiment of the present invention. If the network may support full duplex at the same frequency, whereas the UEs may not be able to support full duplex, or if some cells may support full duplex whereas other cells may not support full duplex, the following approaches may be considered. For the cell supporting full duplex capability or limited full duplex capability, it may support different DL/UL configuration at the same time at the same frequency. For the convenience, a cell with full duplex capability may be referred as "FD-C" and other cells as "HD-C". If there are cells with or without full duplex capabilities in the neighbor, ICIC techniques should consider any cells not supporting full duplex capability. For this, each cell may exchange its capability of full duplex or half duplex capability among cells.

Figure 18:
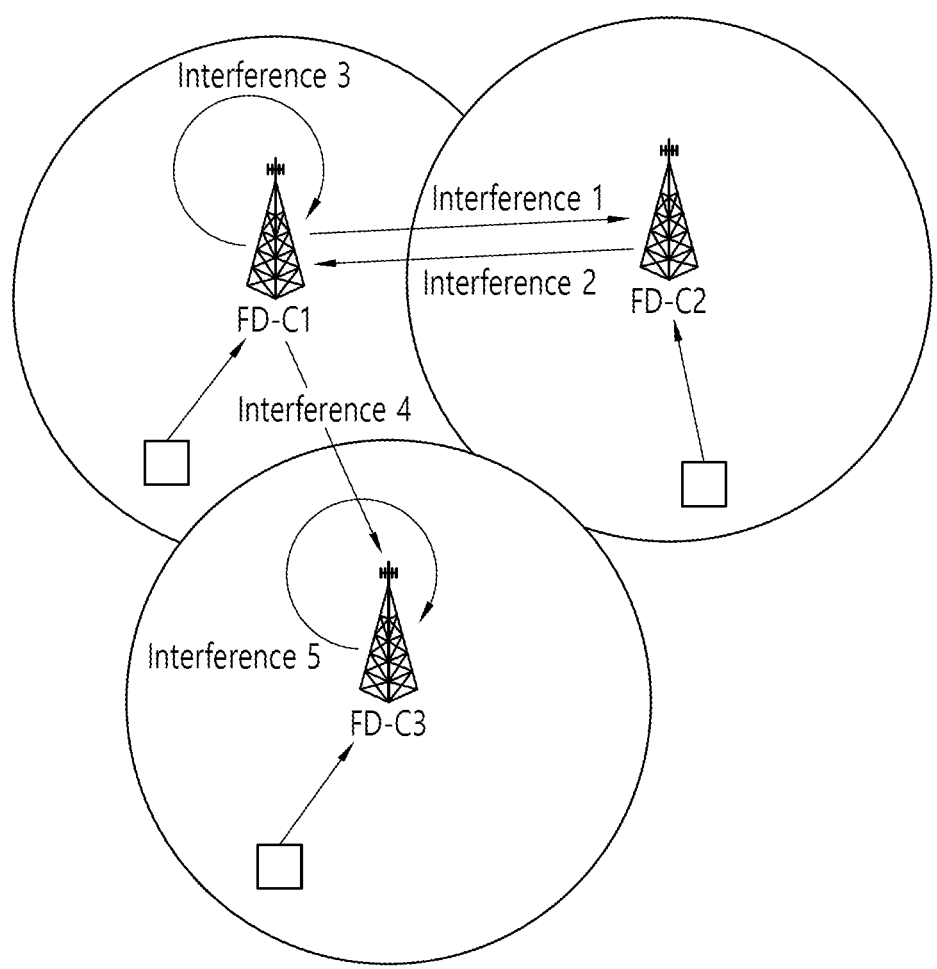
FIG. 18 shows an example of ICIC technique according to an embodiment of the present invention.

FIG. 18 shows an example of ICIC technique according to an embodiment of the present invention. Referring to FIG. 18, there are three cells with different capabilities in the network. It is assumed that cell 1 and 3 have full duplex capability and cell 2 has half duplex capability. In this case, there may be different interference to a cell as follows.

Interference 1: It is interference from full duplex cell DL to half duplex cell UL. For interference 1, it may occur when FD-C1 performs only DL transmission or perform both DL/UL transmissions.

Interference 2: It is interference from half-duplex cell DL to full duplex cell UL. For interference 2, it may occur when FD-C1 also performs DL transmission as well or it may occur when FD-C1 performs only UL transmission Interference 3: It is self-interference of full duplex cell.

Interference 4: It is interference from full duplex cell DL to full duplex cell UL. For interference 4, it may occur when full duplex cell performs both DL/UL transmissions. Or, it may occur when full duplex cell performs either one only.

Interference 1/2/4 may be same and very similar to interference between DL and UL among neighbor cells with half-duplex eNB capability. One approach may be to reduce DL power or increase UL power. Interference 3 may be cancelled by FDR capability.

The following approaches may be considered for ICIC.

(1) At least uplink portions may be aligned among neighbor cells regardless of full duplex capabilities via backhaul signaling. In the aligned UL portions, neighbor cells with full duplex capability may not perform any DL transmissions. In other times, each cell may perform either UL or DL or UL/DL.

(2) Half-duplex cell may broadcast its intended UL portions to neighbor cells. Other neighbor cells may not perform DL in those intended UL portions to protect UL reception of half-duplex cells.

(3) Minimum set of UL portions may be fixed, which cannot be used for DL transmission by any cell such that any UL transmissions can be protected in those fixed UL portions.

The above mechanisms may assume that interference to UE performing DL reception by another UE's transmission may not be significant, or may be mitigated by e.g. power control. In other words, if a UE may not support full duplex capability, existing ICIC mechanisms to mitigate interference on UEs by other UEs may be applied.

In realizing full duplex, as self-interference is significant, different power may be used when the cell performs both DL and UL or only DL transmissions.

(1) Case 1: In this case, FD-C may perform only DL transmission. This type of operation may be assumed for control channel transmission or important messages such as cell broadcast messages or multi-point transmission or achieving very high modulation and coding scheme (MCS) or high modulation. FD-C may indicate its intended DL only portions to its neighbor cells. Accordingly, neighbor cells may also utilize the information to reliably perform DL transmission without considering potential interference from UEs to UEs in such fixed DL portions of full duplex cells. This may also be used for synchronization signal transmission and/or reference signal (RS) transmission which may be essential for self-interference cancellation.

(2) Case 2: In this case, FD-C may perform both DL and UL transmissions. This type of operation may be assumed for data transmissions such as physical uplink shared channel (PUSCH)/physical downlink shared channel (PDSCH). Similar to Case 1, FD-C may indicate its intended portions to its neighbor cells. In this case, DL transmission may be performed with lower power to minimize interference to its neighbor cells. From UE perspective, RS received with lower power needs to be assumed.

(3) Case 3: In this case, FD-C may perform only UL transmission. For example, as mentioned in the above, to protect UL reception of neighbor cells, some portions may be assumed for UL transmission only. For another example, UL transmission portions may be utilized only of UL control portion. This may also be used for PRACH transmission and/or RS transmission where residual interference from self-interference cancellation may affect considerably on the performance.

Considering the above cases, for handling different numerology and/or different TTI lengths in a cell even though it supports full duplex capability, there may be the following cases.

(1) Between two different TTI lengths and/or numerology in a given time (assuming that subband for each numerology and/or TTI length is configured, SB1 may be a subband for FS1, and SB2 may be a subband for FS2), SB1 and SB2 may be allocated with Case 1. As both SB1 and SB2 are allocated with Case 1, no gap may be necessary. If there are operated with different numerology, appropriate guard may be considered. If any neighbor may perform UL transmission in this time, reduced power may be used in this time.

(2) SB1 may be allocated with Case 1 and SB2 may be allocated with Case 2. In this case, to minimize interference from SB1 DL transmission (which would be performed with higher power) on UL reception, some gap for UL transmission may be restricted instead of fully utilizing SB2. In other words, some gaps for UL transmission protection may be considered in SB2. Alternatively, the gap may be created in SB1 instead or partially in both.

(3) SB1 may be allocated with Case 2 and SB1 may be allocated with Case 1. In this case, similar to the above, SB1 may be allocated with gap for UL protection from SB1 DL with higher power transmission. Alternatively, the gap may be created in SB2 instead or partially in both.

(4) SB1 may be allocated with Case 2 and SB2 may be allocated with Case 3. In this case, to protect Case 2 on SB2, either power on SB1 may be reduced or gap may be used between SB1 and SB2 (which can be allocated either in SB1 or SB2 or partially in both). Alternatively, to protect UL, both SB1 and SB2 may be used only for UL.

Depending on the use cases, it may be expected that different numerology/TTI lengths are used in different time/frequency resources.

3. Multi-Carrier Operation

In various cases, e.g. supporting URLLC in TDD, self-contained operation in TDD, efficient usage of resources, multiple carriers may be operated simultaneously and different DL/UL intended configuration may be configured per each carrier.

Figure 19:
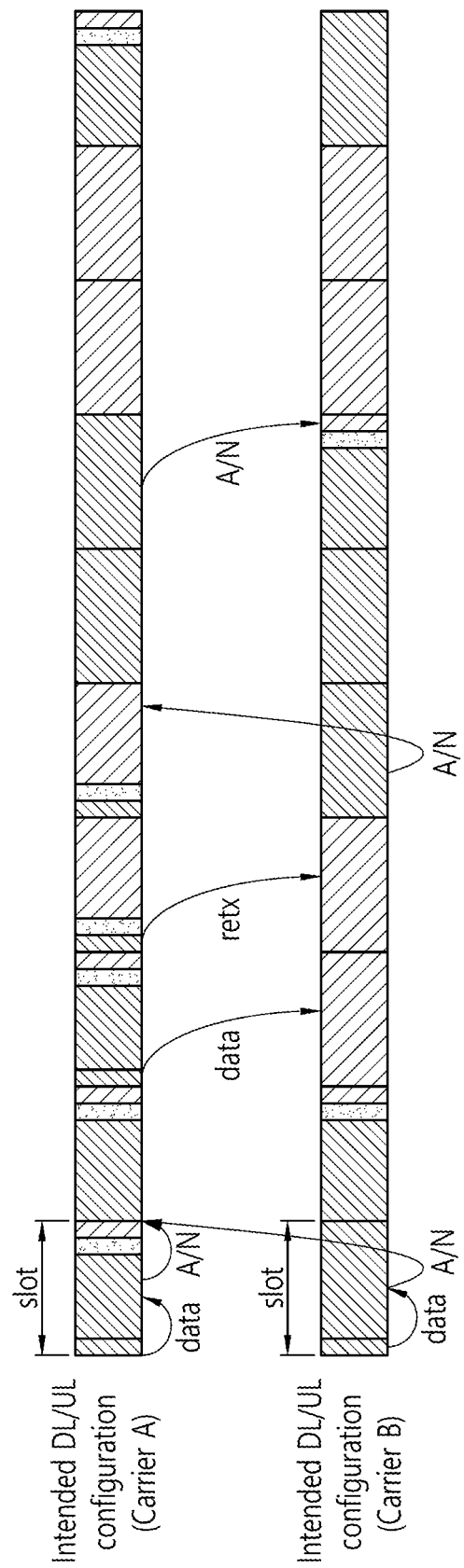
FIG. 19 shows an example of multi-carrier operation with different DL/UL intended configuration according to an embodiment of the present invention.

FIG. 19 shows an example of multi-carrier operation with different DL/UL intended configuration according to an embodiment of the present invention. Referring to FIG. 19, different DL/UL intended configurations are used for carrier A and carrier B, respectively. In this case, cross-carrier data scheduling per subframe or per slot may be configured. Further, ACK/NACK response in different carrier may also be configured. For example, data may be scheduled from the same carrier or from different carrier dynamically.

For dynamic cross-carrier scheduling, the following approaches may be considered.

(1) Each downlink control information (DCI) may contain a carrier index where data is scheduled. A UE may monitor the configured/activated control resource sets and each control resource set may include DCI scheduling the same carrier or different carrier. In this case, it may be necessary to maintain the size of resource allocation to be identical among different carriers. Or, if resource allocation size is different, it may be necessary to indicate the size of resource allocation, such as via two-level DCI, or indicate the size of DCI in the first field or indicate the scheduled carrier separately to infer resource allocation field size. If resource allocation field size is identical among different carriers, it may be the maximum size. Alternatively, the resource allocation field size may follow scheduling carrier configuration. If scheduled carrier's resource allocation field size is larger, truncation may be adopted, and truncated information may be delivered via second level DCI or separate DCI.

(2) Or, in each slot, a UE may be configured dynamically or semi-statically where to read DCI for the corresponding carrier. For example, if there is control region configured in the same carrier in the current slot, the UE may expect DCI from the same carrier, otherwise it may monitor control resource set in different carrier which is configured dynamically or semi-statically. When data is cross-carrier scheduled, the mechanisms of (1) may be used to differentiate scheduled carrier, and in consideration of resource allocation field size.

(3) Or, control resource set scheduling different carrier in a carrier may be separated such that a UE monitors multiple control resource sets and each set is dedicated to a scheduled carrier. This may be used with (1) or (2) above. In this case, resource allocation field size may be different per carrier.

For UL ACK/NACK transmission, it may follow the above procedure for retransmission as well. In other words, initial and retransmission may be scheduled in different carrier. The above mechanisms do not differentiate between DL scheduling and UL grant. In other words, the schemes are applicable to both DL and UL. If ACK/NACK bundling is used for UL transmission (e.g. similar to physical HARQ indicator channel (PHICH) or grouped ACK/NACK transmission per UE), resource may be allocated differently to UE in a carrier. If multiple carriers are scheduled by one carrier, multiple resources for the given UE may be necessary. For example, multiple resources may be reserved for one UE if multiple carriers are scheduled as mentioned in (1) or (2) above. When (3) is used, separate bundled or grouped ACK/NACK may be transmitted per carrier.

For ACK/NACK transmission for DL data, the frequency and/or time location may be dynamically indicated by DL scheduling DCI. The set of preconfigured candidate time and/or frequency locations may be higher layer configured. In dynamic indication, it is also possible to indicate the carrier where ACK/NACK is transmitted.

Numerology used in transmission may follow numerology configured in the scheduled carrier for a channel. For example, for data, scheduled carrier's data numerology may be used. For ACK/NACK transmission, numerology assumed/used in the ACK/NACK transmission carrier may be used. Frequency offset (which can be jointly signaled with carrier index) may be applied within the ACK/NACK transmission carrier. Timing offset may be applied either by the scheduling carrier or ACK/NACK transmission carrier. Or, the timing may follow scheduled carrier for the data.

To mitigate any ambiguity between UE and network, DL assignment index (DAI) may be utilized. Two DAI parameters may be used, one of which is to indicate total and the other is to indicate individual DAI for the given carrier transmitting ACK/NACK per each scheduling DCI. If control resource set is separated or cross or self scheduling is used only, it may be necessary to have another DAI, which is to indicate individual DAI for the scheduled carrier.

Figure 20:
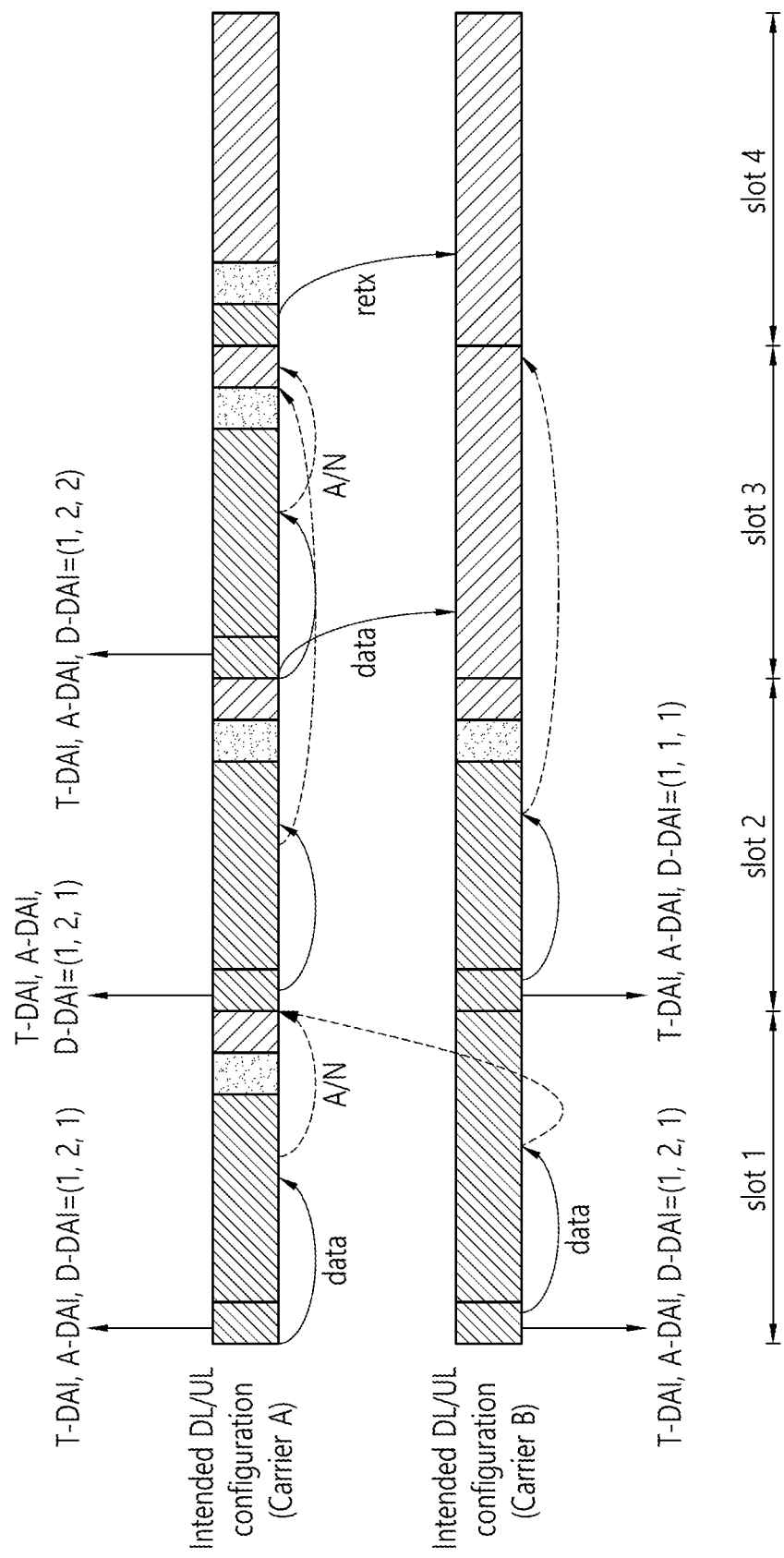
FIG. 20 shows an example of multi-carrier operation with different DL/UL intended configuration according to another embodiment of the present invention.

FIG. 20 shows an example of multi-carrier operation with different DL/UL intended configuration according to another embodiment of the present invention. In FIG. 20, for the convenience, T-DAI may refer total DAI, A-DAI may refer individual total DAI for the given ACK/NACK carrier, and D-DAI may refer total DAI for the scheduled carrier. In slot 0, (T-DAI, A-DAI, D-DAI) becomes (1, 2, 1) for carrier A, which means that the total data transmitted so far is 1 from carrier A, there may be total 2 data transmissions corresponding ACK/NAK timing, and there may be only one scheduled transmission to carrier A so far which has not been feed backed. For carrier B, (T-DAI, A-DAI, D-DAI) becomes (1, 2, 1) similar to carrier A, which means that there is only one scheduling, and there may be total two PDSCHs in the corresponding ACK/NACK resource. In slot 2, (T-DAI, A-DAI, D-DAI) becomes (1, 2, 1) for carrier A, and (1, 1, 1) for Carrier B. As there may be total two ACK/NACK in the corresponding ACK/NACK resource, A-DAI becomes 2 for carrier A, and similarly at slot 3, (T-DAI, A-DAI, D-DAI) becomes (1, 2, 2) for carrier A, where D-DAI becomes 2 as there are two PDSCHs in the same carrier for the given UE.

If different numerology is used, and thus slot size is different, DAI may be assigned for intended resource and intended resource may be determined by time/frequency offset indicated by DCI or semi-statically configured resource.

Figure 21:
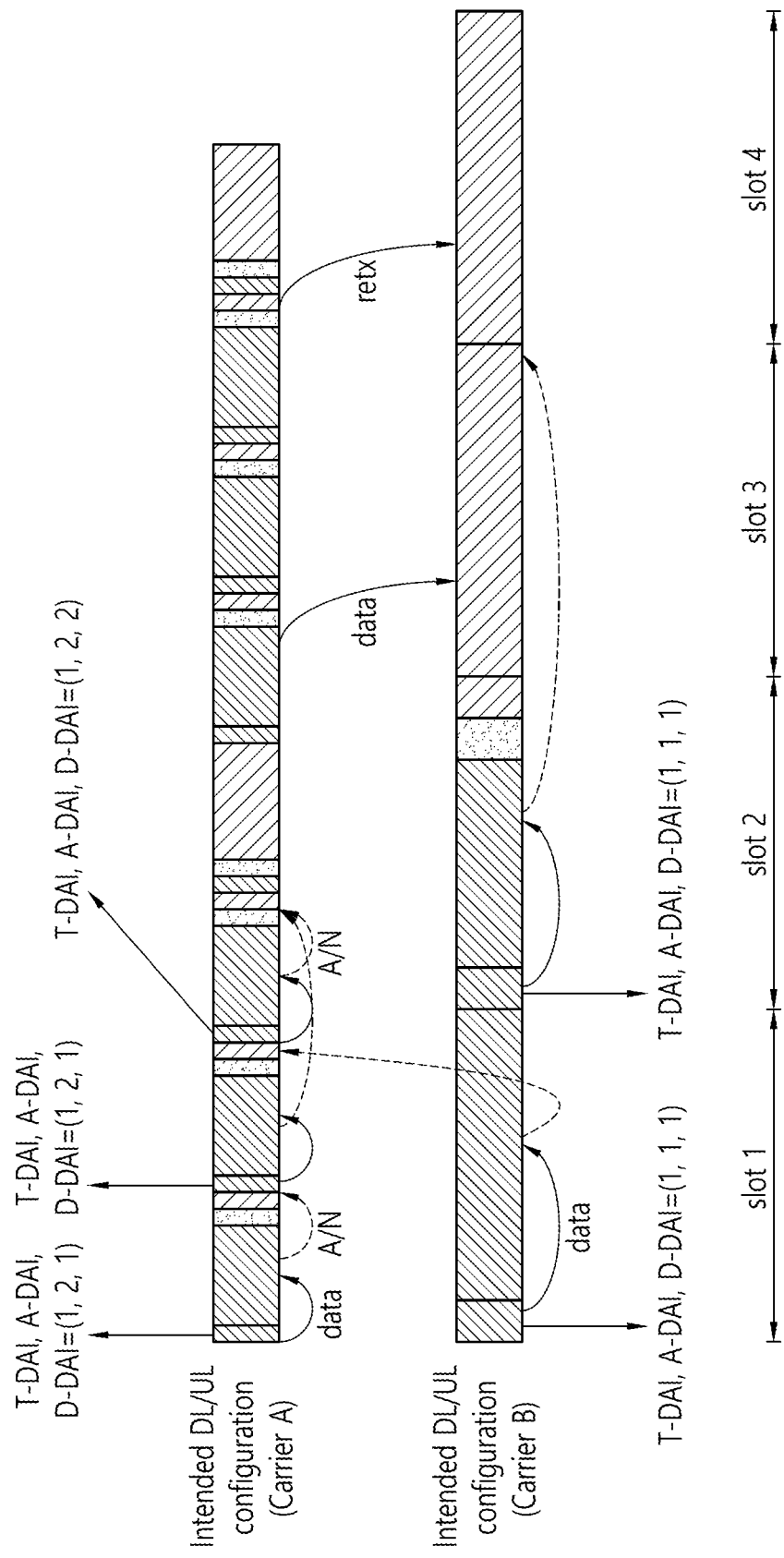
FIG. 21 shows an example of multi-carrier operation with different DL/UL intended configuration according to another embodiment of the present invention.

FIG. 21 shows an example of multi-carrier operation with different DL/UL intended configuration according to another embodiment of the present invention. Referring to FIG. 21, in terms of ACK/NACK timing indication, at slot 1 for carrier B, DCI may indicate timing of 1 if timing is applied based on ACK/NACK carrier, or may indicate timing of 0 if timing is applied based on scheduled carrier or scheduling carrier.

4. Handling Fixed and Flexible Resource

As mentioned above, the resource may be divided into fixed resource and flexible resource. The fixed resource may refer resource with fixed DL or UL portions or reserved resource. The flexible resource may refer resource with flexible resource type which may be dynamically or semi-statically changeable. The network may exchange a set of fixed resources with neighbor cells, and the fixed resource may be assumed to be static among cells. Such fixed resource may be used as intended DL/UL configuration. In other words, intended DL/UL configuration may include a set of slots/subframes and fixed DL, UL, reserved resource portion may be configured within that slot/subframe. For example, first 3 OFDM symbols in each slot may be configured as DL portion, and last 2 OFDM symbols in each slot may be configured as UL portion. If LTE and new RAT share radio resources with each other, fixed resource corresponding to LTE normal subframes and LTE legacy PDCCH region in multicast-broadcast single-frequency network (MBSFN) subframes may be considered.

When intended DL/UL configuration is configured to be smaller than the slot size or scheduling unit, it is possible that one channel (e.g. control or data) may be mapped to both fixed resource and flexible resource at the same time. In other words, when slot-based scheduling is considered, different resource type may be used for single channel transmission. To address this issue, single channel may be mapped in each resource type respectively, which may lead potentially dividing the single channel into multiple channels (e.g. one PDSCH may be divided into multiple mini-slot PDSCHs). If the single channel is mapped to both fixed resource and flexible resource, due to potential interference mitigation techniques (e.g. power control and sensing) at flexible resource, some clarification on UE behavior may be necessary as follows.

(1) Different DL or UL power may be used in fixed/flexible resource. If different power is used in flexible and fixed resource, even in DL transmission, different power may be used. In terms of handling different power, the following mechanisms may be considered.

Demodulation reference signal (DM-RS) may be transmitted in fixed resource and flexible resource separately. The power ratio between DM-RS and data may be constant. If fixed resource and flexible resource are divided, a UE may assume that DM-RS may be transmitted separately in fixed resource and flexible resource. If size of fixed resource or flexible resource is too small to include both DM-RS and data, those resources may not be used or may be used with the same power of the other resources. For example, if a size of the fixed resource is too small, the power used in the flexible resource may be used in the fixed resource as well. In other words, the network may ensure the same power ratio between DM-RS and data. A UE may need to know DM-RS pattern and where each DM-RS may be used for data demodulation. The network may configure DM-RS patterns along with OFDM symbols where DM-RS may be used for channel estimation.

DM-RS may be transmitted in either fixed resource or flexible resource, and the power ratio between DM-RS and data in fixed resource or flexible resource may be separately indicated. The power ratio may be semi-statically configured by the higher layer. As DM-RS may be transmitted in either fixed resource or flexible resource (though DM-RS may not span fixed and flexible resources at least when DM-RS REs using orthogonal cover code (OCC)), the power ratio between DM-RS in fixed resource and data in fixed resource, between DM-RS in fixed resource and data in flexible resource, between DM-RS in flexible resource and data in fixed resource and between DM-RS in flexible resource and data in flexible resource may need to be independently signaled. The power may be different depending on DL/UL configuration among neighbor cells. In that case, power may be dynamically changed, and power ratio or power may be dynamically signaled. Instead of power ratio, actual power may be signaled in fixed resource and flexible resource.

(2) When sensing is used in flexible resource, partial transmission of a channel may be performed after sensing. If sensing is used, it is likely that phase continuity may not be achieved before and after sensing. Thus, if this is used, DM-RS may be transmitted separately in fixed resource and flexible resource respectively. Alternatively, mini-slot or separate scheduling in fixed resource and flexible resource may be utilized independently.

(3) When different power or interference mitigation techniques are used in fixed resource and flexible resource, and/or DM-RS are transmitted independently in fixed resource and flexible resource, it may be also important to exchange the information among neighbor cells or indicate the information via DCI (e.g. group common PDCCH) such that proper cancellation can be achieved. In other words, when slot type indication is used to change direction of flexible resources, power or power offset compared to fixed resource, which is intended to be used in flexible resource for DL or UL, may also be indicated. If DM-RS are transmitted separately, DM-RS position and/or pattern used in flexible resource may also be indicated by common PDCCH.

Figure 22:
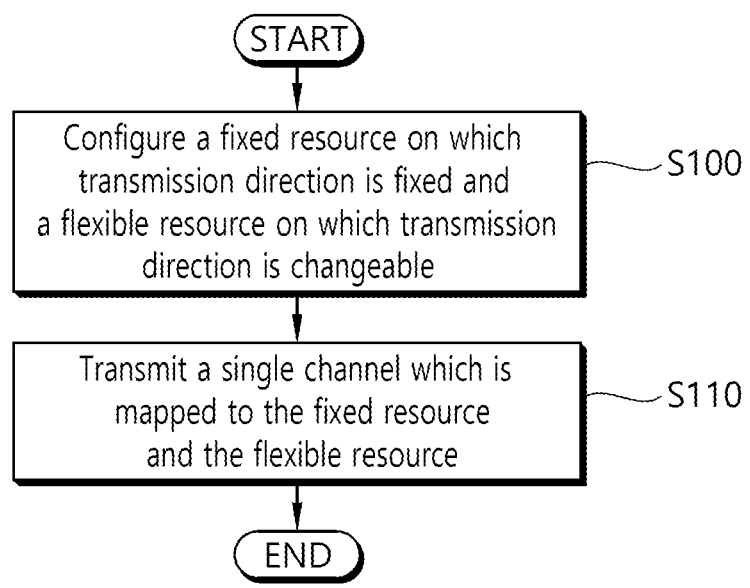
FIG. 22 shows a method for configuring a frame structure by a network node according to an embodiment of the present invention.

FIG. 22 shows a method for configuring a frame structure by a network node according to an embodiment of the present invention. The disclosure of the present invention described above may be applied to this embodiment.

In step S100, the network node configures a fixed resource on which transmission direction is fixed and a flexible resource on which transmission direction is changeable. Information on the fixed resource and the flexible resource may be exchanged between neighbor cells. Information on the fixed resource and the flexible resource may be indicated to a UE. Further, a duplex gap may be configured in the fixed resource. In this case, multiple DL/UL switching points may be configured in the fixed resource.

In step S110, the network nods transmits a single channel which is mapped to the fixed resource and the flexible resource. The single channel may be divided into a first mini channel which is mapped to the fixed resource and a second mini channel which is mapped to the flexible resource.

The first mini channel may be transmitted with a first transmission power, and the second mini channel may be transmitted with a second transmission power, which is different from the first transmission power. In this case, a first DM-RS may be transmitted in the fixed resource and a second DM-RS may be transmitted in the flexible resource.

A first power ratio of the first DM-RS to data mapped to the first mini channel and a second power ratio of the second DM-RS to data mapped to the second mini channel may be identical. Further, a pattern of the first DM-RS and the second DM-RS may be indicated.

Alternatively, a first DM-RS may be transmitted in the fixed resource or a second DM-RS may be transmitted in the flexible resource. A first power ratio of the first DM-RS to data mapped to the first mini channel and a second power ratio of the second DM-RS to data mapped to the second mini channel may be separately indicated. The first power ratio and the second power ratio may be semi-statically configured by higher layer.

Alternatively, the second mini channel may be transmitted after sensing.

Figure 23:
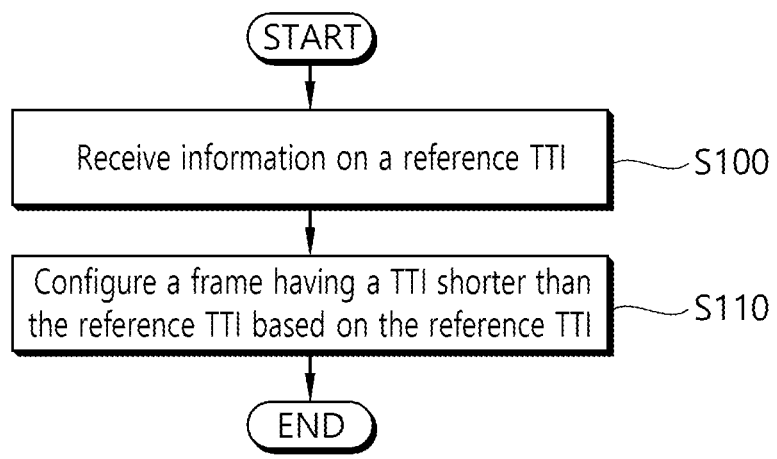
FIG. 23 shows a method performed by a communication device according to an embodiment of the present disclosure.
Figure 24:
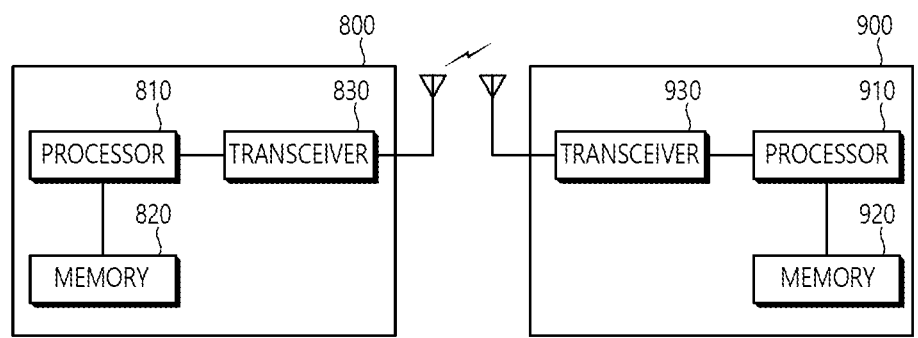
FIG. 24 shows a wireless communication system to implement an embodiment of the present invention.

FIG. 23 shows a method performed by a communication device according to an embodiment of the present disclosure.

Referring to FIG. 23, in step S210, the communication device may receive information on a reference TTI.

In step S220, the communication device may configure a frame having a TTI shorter than the reference TTI based on the reference TTI. UL/DL switching points of the frame may be aligned with UL/DL switching points of a reference frame having the reference TTI.

FIG. 23 shows a wireless communication system to implement an embodiment of the present invention.

A network node 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method performed by a communication device in a wireless communication system, the method comprising:
   receiving information regarding a reference time interval related to a first subcarrier spacing;
   determining time domain boundaries of downlink (DL) symbols and uplink (UL) symbols in a time interval used for a communication, based on the information regarding the reference time interval, wherein the time interval is related to a second subcarrier spacing which is m times the first subcarrier spacing; and
   performing the communication on the DL symbols and the UL symbols in the time interval,
   wherein the time domain boundaries of the DL symbols and the UL symbols are determined based on a time domain boundary of the reference time interval being aligned with a time domain boundary of the time interval,
   wherein a number of the DL symbols for the second subcarrier spacing corresponds to m times a number of DL symbols for the first subcarrier spacing,
   wherein a number of the UL symbols for the second subcarrier spacing corresponds to m times a number of UL symbols for the first subcarrier spacing, and
   wherein the m, the first subcarrier spacing, the number of DL symbols for the first subcarrier spacing and the number of UL symbols for the first subcarrier spacing are positive integers.

2. The method of claim 1, wherein the reference time interval comprises a multiple of the second time intervals each of which is related to the second subcarrier spacing.

3. The method of claim 1, wherein the DL symbols and the UL symbols are transmitted within a frame, and
   wherein the frame includes (i) a fixed resource on which transmission direction is fixed and (ii) a flexible resource on which transmission direction is changeable.

4. The method of claim 3, further comprising receiving information regarding the fixed resource and the flexible resource.

5. The method of claim 3, wherein a single channel is mapped to the fixed resource and the flexible resource.

6. The method of claim 5, wherein the single channel is divided into a first mini channel which is mapped to the fixed resource and a second mini channel which is mapped to the flexible resource.

7. The method of claim 6, wherein the first mini channel is transmitted with a first transmission power, and
   wherein the second mini channel is transmitted with a second transmission power, which is different from the first transmission power.

8. The method of claim 3, wherein a duplex gap is configured in the fixed resource.

9. The method of claim 3, wherein multiple UL/DL switching points are configured in the fixed resource.

10. A communication device configured to operate in a wireless communication system, the communication device comprising:
    a memory;
    a transceiver; and
    at least one processor, coupled to the memory and the transceiver, configured to:
    control the transceiver to receive information regarding a reference time interval related to a first subcarrier spacing,
    determine time domain boundaries of downlink (DL) symbols and uplink (UL) symbols in a time interval used for a communication, based on the information regarding the reference time interval, wherein the time interval is related to a second subcarrier spacing which is m times the first subcarrier spacing; and
    control the transceiver to perform the communication on the DL symbols and the UL symbols in the time interval,
    wherein the time domain boundaries of the DL symbols and the UL symbols are determined based on a time domain boundary of the reference time interval being aligned with a time domain boundary of the time interval,
    wherein a number of the DL symbols for the second subcarrier spacing corresponds to m times a number of DL symbols for the first subcarrier spacing,
    wherein a number of the UL symbols for the second subcarrier spacing corresponds to m times a number of UL symbols for the first subcarrier spacing, and
    wherein the m, the first subcarrier spacing, the number of DL symbols for the first subcarrier spacing and the number of UL symbols for the first subcarrier spacing are positive integers.

11. The communication device of claim 10, wherein the reference time interval comprises a multiple of the second time intervals each of which is related to the second subcarrier spacing.

12. The communication device of claim 10, wherein the DL symbols and the UL symbols are transmitted within a frame, and
    wherein the frame includes (i) a fixed resource on which transmission direction is fixed and (ii) a flexible resource on which transmission direction is changeable.

13. The communication device of claim 12, wherein the at least one processor is further configured to control the transceiver to receive information regarding the fixed resource and the flexible resource.

14. The communication device of claim 12, wherein a single channel is mapped to the fixed resource and the flexible resource.

15. The communication device of claim 14, wherein the single channel is divided into a first mini channel which is mapped to the fixed resource and a second mini channel which is mapped to the flexible resource.

16. The communication device of claim 15, wherein the first mini channel is transmitted with a first transmission power, and
    wherein the second mini channel is transmitted with a second transmission power, which is different from the first transmission power.

17. The communication device of claim 12, wherein a duplex gap is configured in the fixed resource.

18. The communication device of claim 12, wherein multiple UL/DL switching points are configured in the fixed resource.

* * * * *